US011134120B2

(12) United States Patent
Snow

(10) Patent No.: US 11,134,120 B2
(45) Date of Patent: Sep. 28, 2021

(54) LOAD BALANCING IN BLOCKCHAIN ENVIRONMENTS

(71) Applicant: Factom, Austin, TX (US)

(72) Inventor: Paul Snow, Austin, TX (US)

(73) Assignee: Inveniam Capital Partners, Inc., New York, NY (US)

( * ) Notice: Subject to any disclaimer, the term of this patent is extended or adjusted under 35 U.S.C. 154(b) by 727 days.

(21) Appl. No.: 15/983,595

(22) Filed: May 18, 2018

(65) Prior Publication Data

US 2019/0356733 A1 Nov. 21, 2019

(51) Int. Cl.
| G06F 15/173 | (2006.01) |
| H04L 29/08 | (2006.01) |
| H04L 9/06 | (2006.01) |
| G06F 9/455 | (2018.01) |
| G06F 16/27 | (2019.01) |
| G06F 16/18 | (2019.01) |

(52) U.S. Cl.
CPC ...... *H04L 67/1002* (2013.01); *G06F 9/45558* (2013.01); *G06F 16/1805* (2019.01); *G06F 16/27* (2019.01); *H04L 9/0643* (2013.01); *H04L 2209/38* (2013.01); *H04L 2209/56* (2013.01)

(58) Field of Classification Search
CPC ............. H04L 67/1004; H04L 67/1002; H04L 9/0643; H04L 2209/38; H04L 2209/56; G06F 9/45558
See application file for complete search history.

(56) References Cited

U.S. PATENT DOCUMENTS

| 4,309,569 | A | 1/1982 | Merkle |
| 5,499,294 | A | 3/1996 | Friedman |
| 5,862,218 | A | 1/1999 | Steinberg |
| 5,966,446 | A | 10/1999 | Davis |
| 7,272,179 | B2 | 9/2007 | Siemens et al. |
| 7,572,179 | B2 | 8/2009 | Choi et al. |
| 7,729,950 | B2 | 6/2010 | Mendizabal et al. |

(Continued)

FOREIGN PATENT DOCUMENTS

| DE | 10128728 | 1/2003 |
| JP | 5383297 | 1/2014 |

(Continued)

OTHER PUBLICATIONS

Watanabe, Hiroki, et al. "Blockchain contract: Securing a blockchain applied to smart contracts." *2016 IEEE International Conference on Consumer Electronics (ICCE)*. IEEE, 2016.

(Continued)

*Primary Examiner* — Oleg Survillo
(74) *Attorney, Agent, or Firm* — Scott P. Zimmerman, PLLC

(57) ABSTRACT

Hardware and software resources are load balanced when processing multiple blockchains. As more and more entities (whether public or private) are expected to generate their own blockchains for verification, a server or other resource in a blockchain environment may be over utilized. For example, as banks, websites, and retailers issue their own private cryptocoinage, the number of financial transactions may clog or hog networking and/or hardware resources. A blockchain load balancing mechanism thus allocates resources among the multiple blockchains.

8 Claims, 29 Drawing Sheets

(56) References Cited

U.S. PATENT DOCUMENTS

| | | |
|---|---|---|
| 8,245,038 B2 | 8/2012 | Golle et al. |
| 8,266,439 B2 | 9/2012 | Haber et al. |
| 8,442,903 B2 | 5/2013 | Zadoorian et al. |
| 8,560,722 B2 | 10/2013 | Gates et al. |
| 8,706,616 B1 | 4/2014 | Flynn |
| 8,712,887 B2 | 4/2014 | DeGroeve et al. |
| 8,867,741 B2 | 10/2014 | McCorkindale et al. |
| 8,943,332 B2 | 1/2015 | Horne et al. |
| 9,124,423 B2 | 9/2015 | Jennas, II et al. |
| 9,396,006 B2 | 7/2016 | Kundu et al. |
| 9,407,431 B2 | 8/2016 | Bellare et al. |
| 9,411,524 B2 | 8/2016 | O'Hare et al. |
| 9,411,976 B2 | 8/2016 | Irvine |
| 9,411,982 B1 | 8/2016 | Dippenaar et al. |
| 9,424,576 B2 | 8/2016 | Vandervort |
| 9,436,935 B2 | 9/2016 | Hudon |
| 9,472,069 B2 | 10/2016 | Roskowski |
| 9,489,827 B2 | 11/2016 | Quinn et al. |
| 9,584,493 B1 | 2/2017 | Leavy |
| 9,722,790 B2 | 8/2017 | Ebrahimi |
| 9,876,646 B2 | 1/2018 | Ebrahimi |
| 9,882,918 B1 | 1/2018 | Ford et al. |
| 2003/0018563 A1 | 1/2003 | Kilgour et al. |
| 2004/0085445 A1 | 5/2004 | Park |
| 2005/0206741 A1 | 9/2005 | Raber |
| 2006/0075228 A1 | 4/2006 | Black et al. |
| 2006/0184443 A1 | 8/2006 | Erez et al. |
| 2007/0094272 A1 | 4/2007 | Yeh |
| 2007/0296817 A1 | 12/2007 | Ebrahimi et al. |
| 2008/0010466 A1 | 1/2008 | Hopper |
| 2009/0025063 A1 | 1/2009 | Thomas |
| 2009/0287597 A1 | 11/2009 | Bahar |
| 2010/0049966 A1 | 2/2010 | Kato |
| 2010/0058476 A1 | 3/2010 | Isoda |
| 2010/0161459 A1 | 6/2010 | Kass et al. |
| 2010/0241537 A1 | 9/2010 | Kass et al. |
| 2013/0222587 A1 | 8/2013 | Roskowski |
| 2014/0229738 A1 | 8/2014 | Sato |
| 2014/0344015 A1 | 11/2014 | Puertolas-Montanes et al. |
| 2015/0206106 A1* | 7/2015 | Yago .................. G06Q 20/0655 705/68 |
| 2016/0071096 A1 | 3/2016 | Rosca |
| 2016/0119134 A1 | 4/2016 | Hakoda et al. |
| 2016/0148198 A1 | 5/2016 | Kelley |
| 2016/0162897 A1 | 6/2016 | Feeney |
| 2016/0217436 A1 | 7/2016 | Brama |
| 2016/0253663 A1 | 9/2016 | Clark et al. |
| 2016/0260091 A1 | 9/2016 | Tobias |
| 2016/0267472 A1 | 9/2016 | Lingham et al. |
| 2016/0267558 A1 | 9/2016 | Bonnell et al. |
| 2016/0275294 A1 | 9/2016 | Irvine |
| 2016/0283920 A1 | 9/2016 | Fisher et al. |
| 2016/0292396 A1 | 10/2016 | Akerwall |
| 2016/0292672 A1 | 10/2016 | Fay et al. |
| 2016/0292680 A1 | 10/2016 | Wilson, Jr. et al. |
| 2016/0300200 A1 | 10/2016 | Brown et al. |
| 2016/0300234 A1 | 10/2016 | Moss-Pultz et al. |
| 2016/0321675 A1 | 11/2016 | McCoy et al. |
| 2016/0321751 A1 | 11/2016 | Creighton, IV et al. |
| 2016/0328791 A1 | 11/2016 | Parsells et al. |
| 2016/0330031 A1 | 11/2016 | Drego et al. |
| 2016/0330244 A1 | 11/2016 | Denton |
| 2016/0337119 A1 | 11/2016 | Hosaka et al. |
| 2016/0342977 A1 | 11/2016 | Lam |
| 2016/0342989 A1 | 11/2016 | Davis |
| 2016/0344737 A1* | 11/2016 | Anton .................. G06F 21/6218 |
| 2017/0005797 A1 | 1/2017 | Lanc et al. |
| 2017/0053249 A1 | 2/2017 | Tunnell et al. |
| 2017/0061396 A1 | 3/2017 | Melika et al. |
| 2017/0075938 A1* | 3/2017 | Black .................. G06F 21/602 |
| 2017/0124534 A1 | 5/2017 | Savolainen |
| 2017/0124535 A1 | 5/2017 | Juels et al. |
| 2017/0177898 A1 | 6/2017 | Dillenberger |
| 2017/0213287 A1 | 7/2017 | Bruno |
| 2017/0243208 A1 | 8/2017 | Kurian et al. |
| 2017/0243289 A1 | 8/2017 | Rufo |
| 2017/0244757 A1 | 8/2017 | Castinado et al. |
| 2017/0330279 A1 | 11/2017 | Ponzone |
| 2017/0352031 A1 | 12/2017 | Collin |
| 2017/0373859 A1 | 12/2017 | Shors et al. |
| 2018/0075527 A1 | 3/2018 | Nagla et al. |
| 2018/0091524 A1 | 3/2018 | Setty |
| 2018/0097779 A1 | 4/2018 | Karame et al. |
| 2018/0157700 A1 | 6/2018 | Roberts |
| 2018/0189781 A1* | 7/2018 | McCann .............. G06Q 20/202 |
| 2018/0276668 A1* | 9/2018 | Li ........................ G06Q 20/401 |
| 2019/0268141 A1* | 8/2019 | Pandurangan ............ H04L 9/14 |
| 2019/0287107 A1* | 9/2019 | Gaur ...................... G06Q 30/04 |
| 2019/0288832 A1* | 9/2019 | Dang ...................... H04L 9/0637 |
| 2019/0342422 A1* | 11/2019 | Li ............................ H04L 67/32 |
| 2019/0391540 A1* | 12/2019 | Westervelt ................ F02C 9/00 |

FOREIGN PATENT DOCUMENTS

| | | |
|---|---|---|
| KR | 100653512 | 12/2006 |
| KR | 01747221 | 6/2017 |
| WO | WO 0049797 | 8/2000 |
| WO | WO 2007069176 | 6/2007 |
| WO | WO 2015077378 | 5/2015 |
| WO | WO 2018013898 A1 | 1/2018 |
| WO | WO 2018109010 | 6/2018 |

OTHER PUBLICATIONS

"BlockChain Technology", Berkeley Engineering.

Alsolami, Fahad, and Terrance E. Boult. "CloudStash: using secret-sharing scheme to secure data, not keys, in multi-clouds." *Information Technology: New Generations (ITNG), 2014 11th International Conference on.* IEEE, 2014.

"Midex", https://promo.midex.com/Midex_EN.pdf.

Xtrade White Paper, https://xtrade1-9649.kxcdn.com/wp-content/uploads/2017/09/xtrade-whitepaper.pdf.

Chakravorty, Antorweep, and Chunming Rong. "Ushare: user controlled social media based on blockchain." *Proceedings of the 11th International Conference on Ubiquitous Information Management and Communication.* ACM, 2017.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017.

Unkown, "Federated Learning: Collaborative Machine Learning without Centralized Training Data" Apr. 6, 2017, 11 pages.

Casey, "BitBeat: Factom Touts Blockchain Tool for Keeping Record Keepers Honest", Wall Street Journal, Nov. 5, 2014.

Crosby, Michael et al., "BlockChain Technology, Beyond Bitcoin", Sutardja Center for Entrepreneurship & Technology, Berkeley Engineering, Oct. 16, 2015, 35 pages.

Al-Naji, Nader et al., "Basis: A Price-Stable Cryptocurrency with an Algorithmic Central Bank" www.basis.io Jun. 20, 2017, 27 pages.

Haarmann, et al., "DMN Decision Execution on the Ethereum Blockchain," Hasso Plattner Institute, University of Potsdam, 15 pages.

Kim et al., "A Perspective on Blockchain Smart Contracts," Schulich School of Business, York University, Toronto, Canada, 6 pages.

\* cited by examiner

LOAD BALANCING IN BLOCKCHAIN ENVIRONMENTS

CROSS-REFERENCE TO RELATED APPLICATIONS

This patent application relates to U.S. application Ser. No. 15/983,572 filed May 18, 2018, entitled "Private Cryptocoinage in Blockchain Environments", and incorporated herein by reference in its entirety. This patent application also relates to U.S. application Ser. No. 15/983,612 filed May 18, 2018, entitled "Import and Export in Blockchain Environments," since issued as U.S. Pat. No. 10,783,164, and incorporated herein by reference in its entirety. This patent application also relates to U.S. application Ser. No. 15/983,632 filed May 18, 2018, entitled "Personal Blockchain Services", and incorporated herein by reference in its entirety. This patent application also relates to U.S. application Ser. No. 15/983,655 filed May 18, 2018, entitled "Private Blockchain Services", and incorporated herein by reference in its entirety.

BACKGROUND

Decentralized cryptographic coinage is growing. As cryptographic coinage continues to gain acceptance, many entities will want to offer their own cryptographic coinage.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
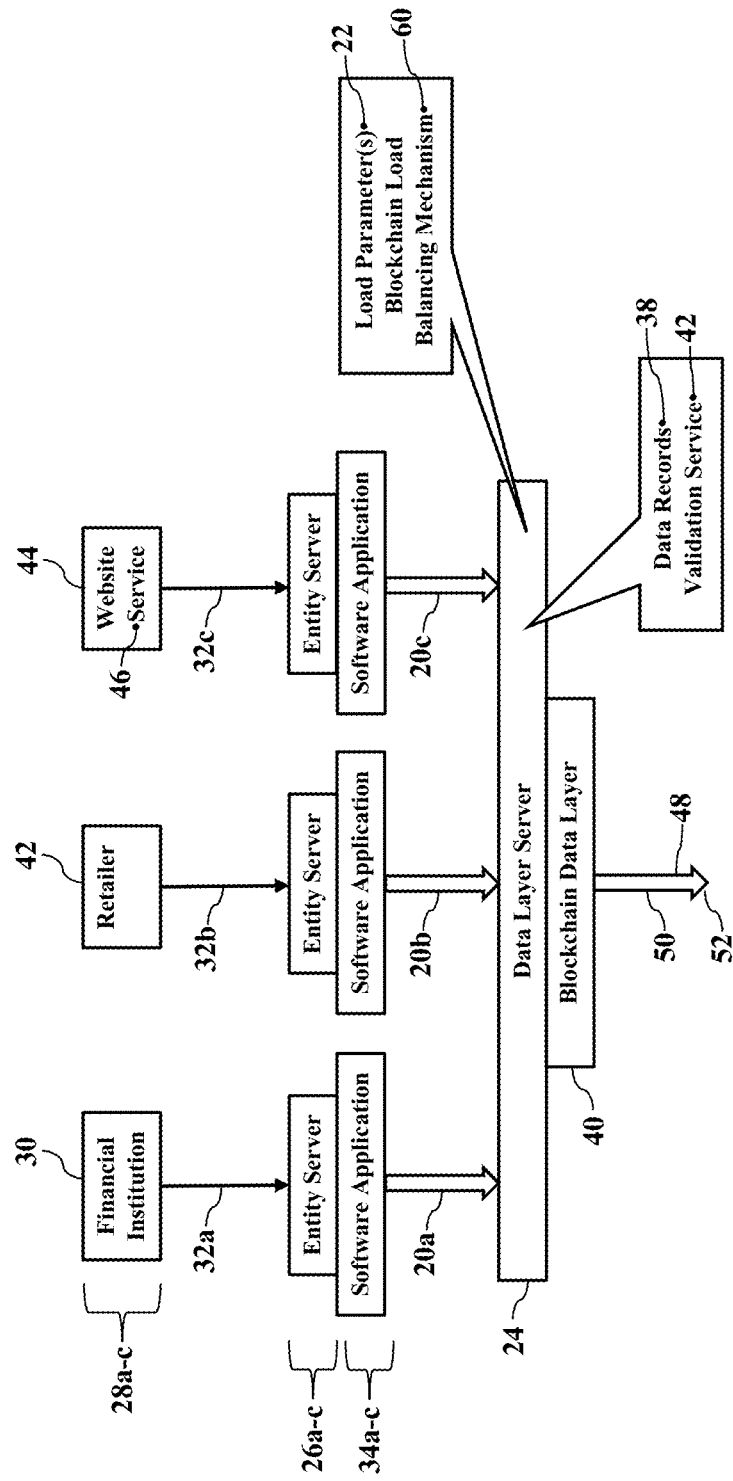
FIGS. 1-6 are simplified illustrations of load balancing of blockchains, according to exemplary embodiments.

FIGS. 1-6 are simplified illustrations of load balancing of blockchains, according to exemplary embodiments. Exemplary embodiments allocate processing of multiple blockchains 20, based on one or more load parameters 22. FIG. 1, for example, illustrates a data layer server 24 receiving the multiple blockchains 20. In actual practice the data layer server 24 may receive several, tens, or even hundreds of different blockchains 20. For simplicity, though, FIG. 1 only illustrates three (3) blockchains 20*a-c*. Each blockchain 20*a-c* may be sent from a corresponding entity server 26*a-c* that is operated on behalf of some entity 28*a-c*. While exemplary embodiments may be applied to any public or private entity, FIG. 1 illustrates entities 28*a-c* that are familiar to most readers. The entity server 26*a*, for example, is operated on behalf of a bank, lender, or other financial institution 30 (such as PIMCO®, CITI®, or BANK OF AMERICA®). As the reader likely understands, the financial institution 30 creates a massive amount of banking records, transaction records, mortgage instruments, and other private data 32*a*. The entity server 26*a* executes a software application 34*a* that encrypts its private data 32*a*. While the financial institution 30 may use any encryption scheme, FIG. 1 illustrates a private blockchain 20*a*. That is, the financial institution's entity server 26*a* cryptographically hashes its private data 32*a* into the private blockchain 20*a* and sends or feeds the private blockchain 20*a* to the data layer server 24. The data layer server 24 then uses the private blockchain 20*a* to generate various data records 38 associated with a blockchain data layer 40, as later paragraphs will explain.

The data layer server 24 may also receive the additional blockchains 20*b* and 20*c*. Blockchain 20*b*, for example, may be generated by the entity server 26*b* that is operated on behalf of the entity 28*b*. FIG. 1 illustrates the entity 28*b* as any retailer 42 (such as HOME DEPOT®, KOHL'S®, or WALMART®) that sends its private data 32*b* to the entity server 26*b*. The entity server 26*b* executes software application 34*b* to cryptographically hash the private data 32*b* into the private blockchain 20*b*. The entity server 26*b* sends or feeds the private blockchain 20*b* to the data layer server 24. Similarly, entity 28*c* represents any website 44 offering an online service 46 (such as AMAZON®, NETFLIX®, or GOOGLE®). The entity server 26*c* executes the software application 34*c* to cryptographically hash the private data 32*c*, generate the private blockchain 20*c*, and send the private blockchain 20*c* to the data layer server 24.

The data layer server 24 thus receives the multiple blockchains 20*a*-*c*. The data layer server 24 accepts the private blockchains 20*a*-*c* as inputs and generates the blockchain data layer 40. The blockchain data layer 40 contains the various data records 38, as later paragraphs will explain. Moreover, the blockchain data layer 40 may also add another layer of cryptographic hashing to generate one or more cryptographic proofs 48. The cryptographic proofs 48 may then be incorporated into one or more public blockchains 50. The blockchain data layer 40 may thus acts as a validation service 52 for the private blockchains 20*a*-*c*. The public blockchain 50 thus publishes the cryptographic proofs 48 as a public ledger 52 that establishes chains of blocks of immutable evidence. Each cryptographic proof 48 thus provides evidentiary documentation of the blocks of data contained within the respective private blockchains 20*a*-*c*.

Exemplary embodiments, though, may limit or allocate the data layer server 24 and/or the blockchain data layer 40. That is, as the data layer server 24 receives the private blockchains 20*a*-*c* and generates the blockchain data layer 40, exemplary embodiments may implement a blockchain load balancing mechanism 60. The blockchain load balancing mechanism 60 analyzes any information or data (such as the one or more load parameters 22) to determines how and/or when data layer server 24 processes the private blockchains 20*a*-*c* to generate the blockchain data layer 40. The blockchain load balancing mechanism 60 thus determines how the multiple blockchains 20*a*-*c* share, consume, or monopolize the processing capabilities of the data layer server 24 and/or the blockchain data layer 40.

Figure 2:
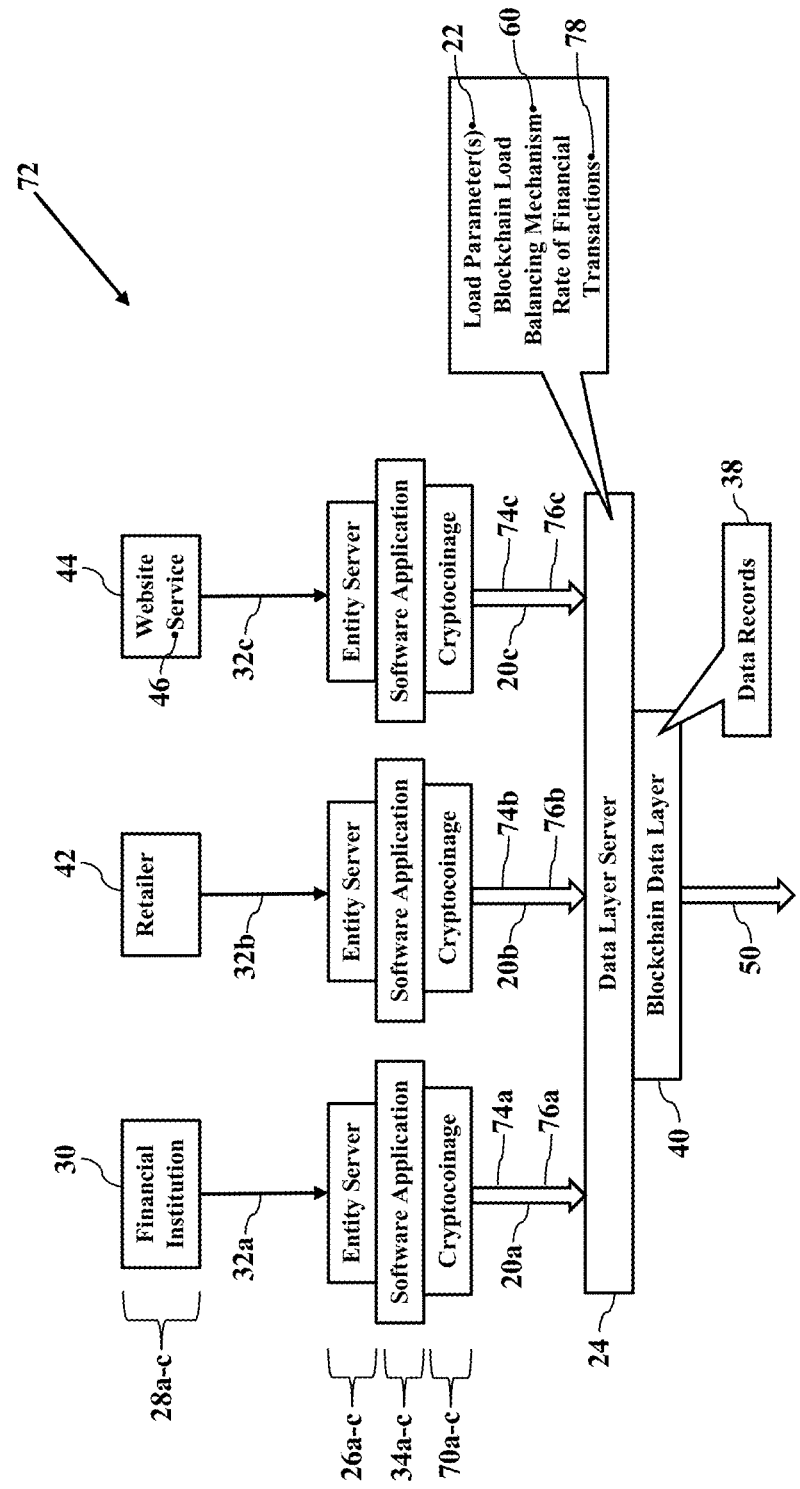

FIG. 2 illustrates an example of preferential processing. Here the blockchain load balancing mechanism 60 may allocate the private blockchains 20*a*-*c* based on financial transactions associated with cryptographic coinage (or "cryptocoinage") 70. The blockchain load balancing mechanism 60 may operate in a blockchain environment 72 in which each entity 28*a*-*c* may create and issue its own private cryptocoinage 70*a*-*c*. The inventor predicts that as more and more businesses adopt blockchain technology, more and more businesses will issue their own, private cryptocoinage 70. Indeed, as many people are expected to adopt the private cryptocoinage 70 issued by different financial institutions, national retailers (such as HOME DEPOT®, KOHL'S®, or WALMART®), and popular website services (such as AMAZON®, NETFLIX®, or GOOGLE®), the inventor expects that the many different private blockchains 20*a*-*c* will contain data representing millions or billions of financial transactions per day. The blockchain load balancing mechanism 60 may thus determine how the data layer server 24 is shared to ensure the blockchain data layer 40 adequately validates the financial transactions. The blockchain load balancing mechanism 60 thus allocates the processing and memory capabilities of the data layer server 24 to process each entity's private cryptocoinage 70*a*-*c*.

The load parameter 22 may thus represent financial transactions. Blockchain 20*a*, for example, may contain blocks 74*a* of data representing financial transactions 76*a* associated with the entity's private cryptocoinage 70*a*. Blockchains 20*b* and 20*c* would similarly contain blocks 74*b*-*c* of data representing financial transactions 76*b*-*c* associated with the entity's private cryptocoinage 70*b*-*c*. As the blockchains 20*a*-*c* stream as inputs to the data layer server 24, the blockchain load balancing mechanism 60 determines a rate 78 of the financial transactions 76 that corresponds to each different blockchain 20*a*-*c*. While the rate 78 may be measured or defined according to any measure, most readers are thought familiar with a count or sum of the financial transactions 76 per unit time (such as seconds, minutes, hours, or per day). The blockchain load balancing mechanism 60 may read, inspect, or sample any of the blockchains 20 and count or sum any blocks 74 of data representing a financial transaction 76 occurring within a window of time. The blockchain load balancing mechanism 60 computes or determines the rate 78 (e.g., number of the financial transactions 76 per second). The blockchain load balancing mechanism 60 may then use the rate 78 to determine how the multiple blockchains 20*a*-*c* share, consume, or monopolize the processing capabilities of the data layer server 24 and/or the blockchain data layer 40.

Figure 3:
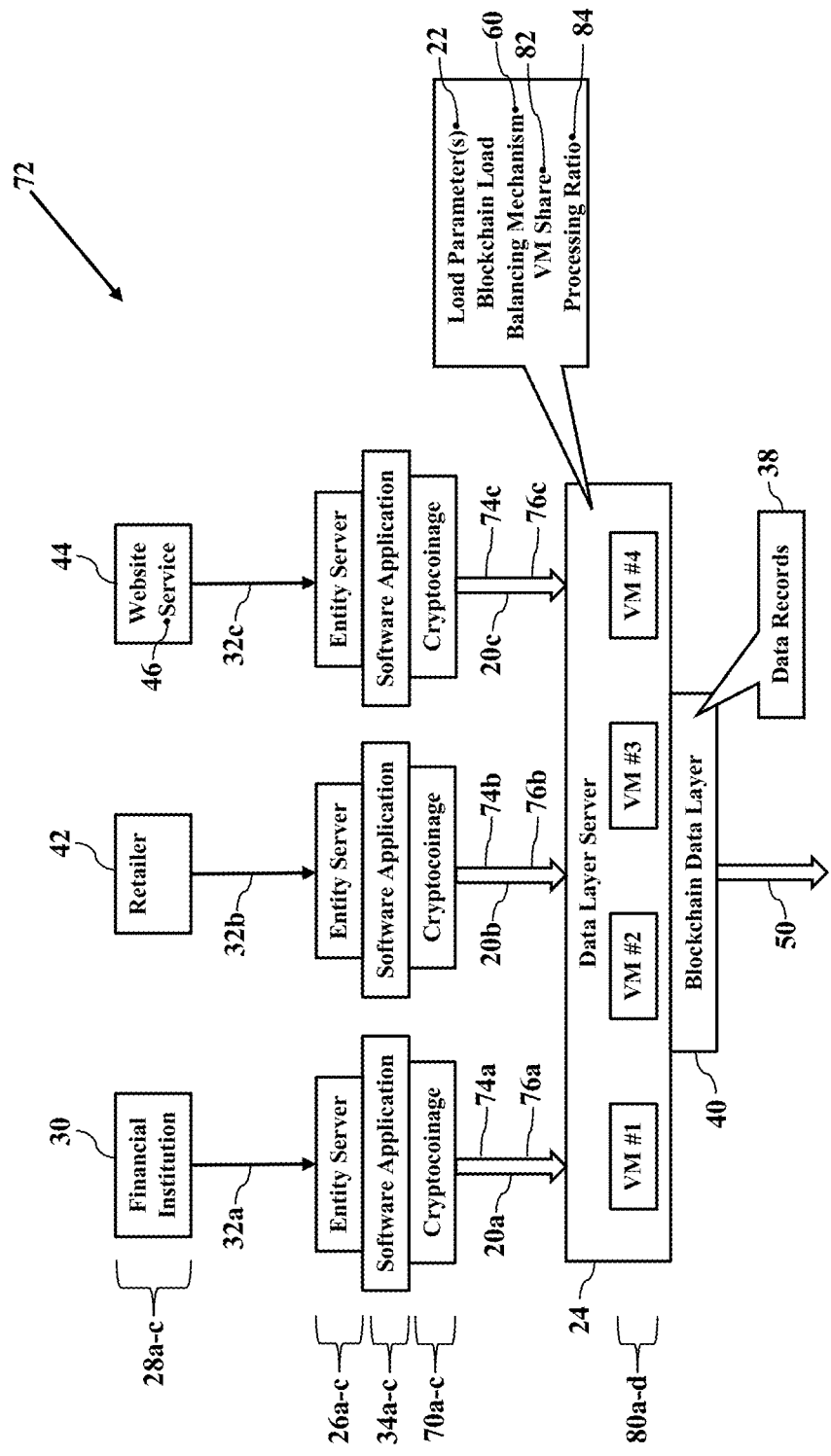

FIG. 3 illustrates virtual computing. Here the blockchain load balancing mechanism 60 manages virtual machines (or "VM") 80 sharing the data layer server 24. The data layer server 24 may provide virtual computing and/or virtual hardware resources to client devices (such as the entity servers 26*a*-*c*). The data layer server 24 may lend or share its hardware, computing, and programming resources with any of the entity servers 26*a*-*c*. The data layer server 24 thus operates or functions as a virtual, remote resource for generating the blockchain data layer 40. The data layer server 24 may present or operate as one or more virtual machines 80. Each one of the virtual machines 80 may provide its processing or application resource to any of the entity servers 26*a*-*c*. While FIG. 3 only illustrates four (4) virtual machines 80*a*-*d*, the number or instantiations may be several or even many, depending on complexity and resources.

Load balancing may be desired. As the data layer server 24 may provide resources to many different entity servers 26, optimal management techniques may be desired. That is, as the entity servers 26 make requests for data or processing, some of the shared resources in the data layer server 24 may be over utilized. The blockchain load balancing mechanism 60 may thus balance or distribute processing and/or memory loads among the virtual machines 80. The blockchain load balancing mechanism 60 may assign or distribute one of the private blockchains 20 to a particular virtual machine 80 for processing. Suppose, for example, that each virtual machine 80a-d is assigned a corresponding share 82a-c of the total resources of the data layer server 24. As the private blockchains 20a-c are received as inputs, the blockchain load balancing mechanism 60 inspects the private blockchains 20a-c and determines a corresponding processing ratio 84a-c (which later paragraphs will explain in more detail). The blockchain load balancing mechanism 60 may then assign a particular one of the virtual machines 80a-c, based on the processing ratio 84a-c and the share 82a-c assigned to each virtual machine 80a-c. Each private blockchain 20, in other words, may be assigned a processing bandwidth or slice of the data layer server 24 according to its processing load or burden.

Figure 4:
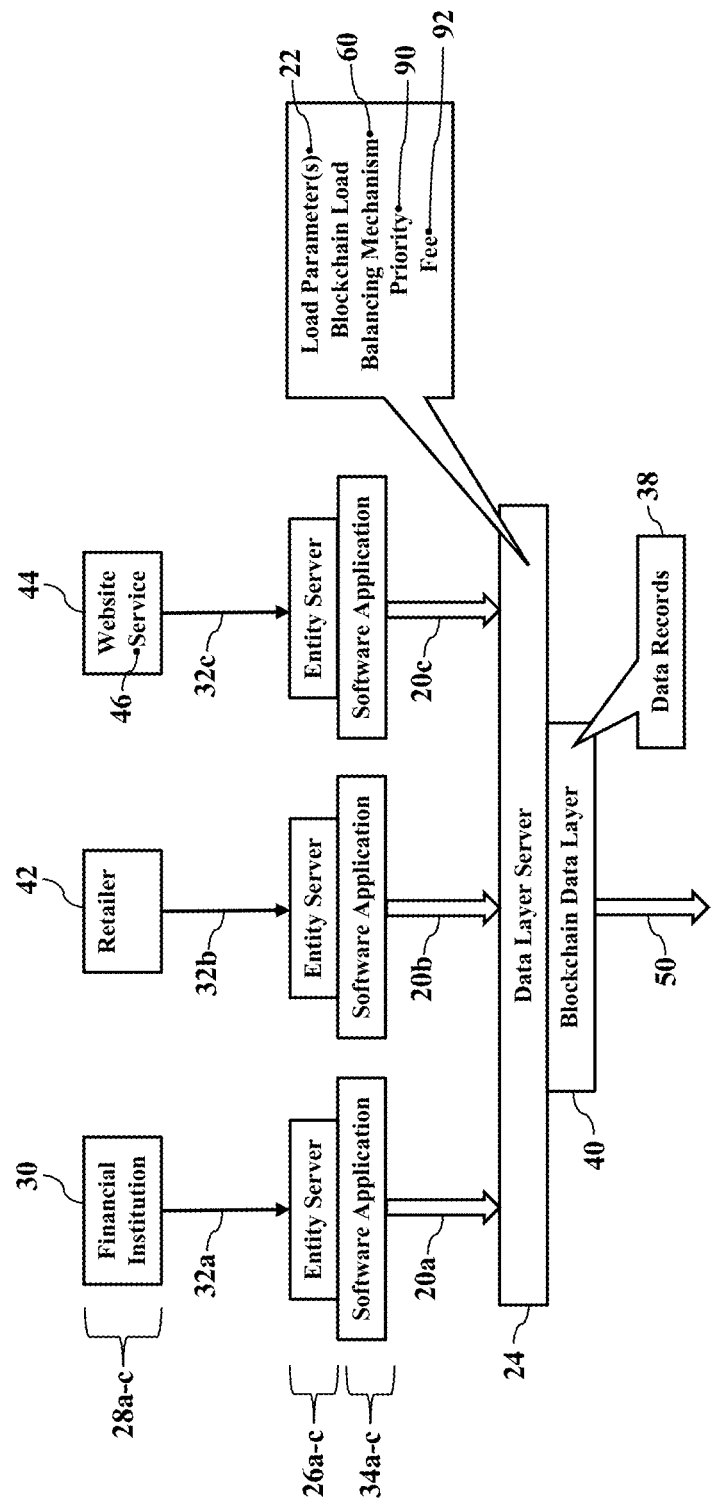

FIG. 4 illustrates another example of preferential processing. Suppose that the blockchain load balancing mechanism 60 awards, recognizes, or applies a priority 90 to the private blockchain 20a. The priority 90 may be based on any factor or parameter (such as the load parameter 22). Here, though, the priority 90 may be based on a processing fee 92. That is, the entity 28a may, somehow, pay the higher or greater processing fee 92 for expedited processing of its private blockchain 20a. When the data layer server 24 and/or in the blockchain data layer 40 receive and/or process the private blockchain 20a, exemplary embodiments may prioritize the entity's private blockchain 20a, in response to payment of the processing fee 92. Suppose, for example, that the processing fee 92 is paid in credits, tokens, or other cryptocurrency. The processing fee 92, of course, may also be paid in conventional currency. Regardless, the data layer server 24 and/or the blockchain data layer 40 may thus dedicate a disproportionate or unequal share of its hardware and/or software processing capabilities to the private blockchain 20a. When the blockchain load balancing mechanism 60 no longer designates the priority 90 to the private blockchain 20a, the data layer server 24 and/or the blockchain data layer 40 may then commence or resume processing any of the other private blockchains 20b or 20c.

Figure 5:
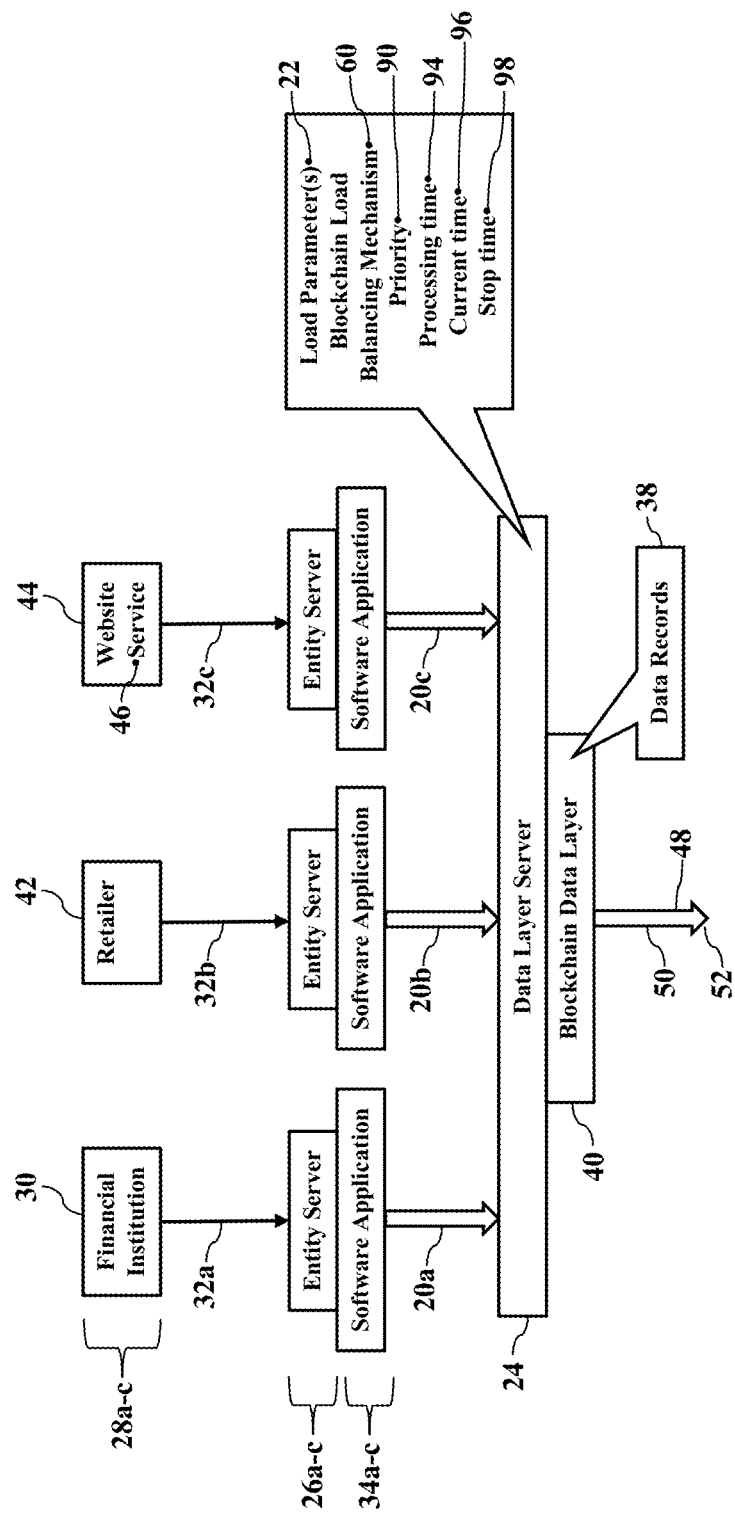

FIG. 5 illustrates another example of preferential processing. Here the load parameter 22 may be based on a processing time 94. Each private blockchain 20a-c, in other words, may be processed when a current time 96 (perhaps determined by an internal or network clock) matches or coincides with the corresponding processing time 94 assigned to each private blockchain 20a-c. When the current time 96 equals, matches, or otherwise corresponds to a particular one of the processing times 94, then the data layer server 24 and/or the blockchain data layer 40 may begin or commence processing the corresponding private blockchain 20. The blockchain load balancing mechanism 60 may be configured with an optional, corresponding stop time 98 at which the data layer server 24 and/or the blockchain data layer 40 stops preferential processing of the private blockchain 20a-c. A simple example may be that blockchain 20c is associated with a daily 3 am processing time 94. At 3 am, in other words, the data layer server 24 and/or the blockchain data layer 40 starts dedicating its hardware/software resources to the blockchain 20c. If the stop time 98 is 5 am, then exemplary embodiments may solely, or preferably, process the blockchain 20c for a two-hour interval, before the other blockchains 20a and 20b are processed. The blockchain load balancing mechanism 60 may thus implement a recurring interval in which the priority 90 may be applied. However, if the blockchain 20c is entirely processed prior to the 5 am stop time 98, then exemplary embodiments may transition to processing of the other blockchains 20a and 20b. The blockchain load balancing mechanism 60 may thus be configured prioritize processing according to a daily schedule.

Figure 6:
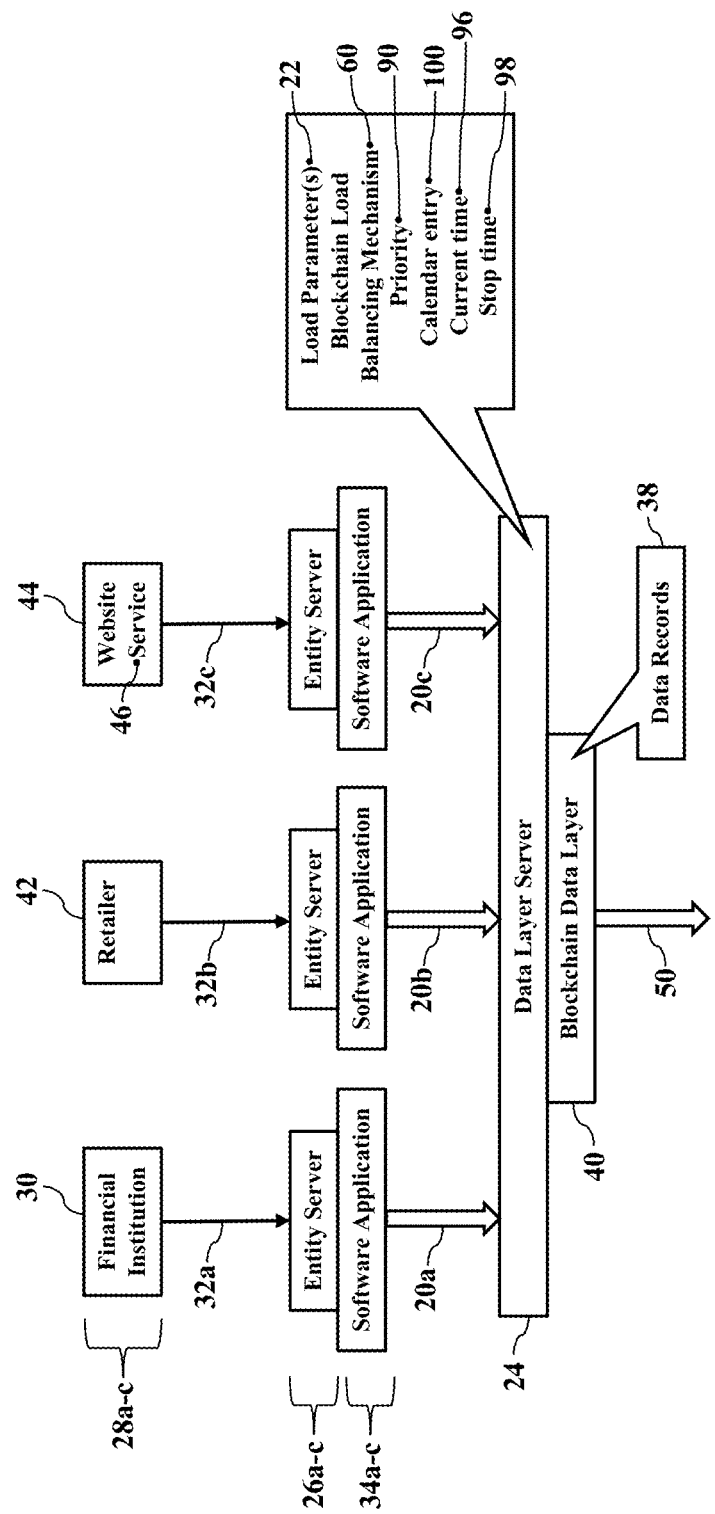

FIG. 6 illustrates calendar-based preferential processing. Here each private blockchain 20a-c may be associated with a corresponding calendar entry 100 (e.g., date and time) for processing. The blockchain load balancing mechanism 60 compares the current time 96 (e.g., day and time) to the calendar entry 100 associated with each blockchain 20a-c. When the current time 96 matches or coincides with the calendar entry 100, the blockchain load balancing mechanism 60 may instruct the data layer server 24 and/or the blockchain data layer 40 to commence processing. Processing may continue until the private blockchain 20 is exhausted (that is, all blocks of data received by the private blockchain 20 have been processed). The blockchain load balancing mechanism 60, however, may stop processing, or commence shared processing, at the corresponding stop time 98 (e.g., day and time), such as when the calendar entry 100 expires.

Figure 7:
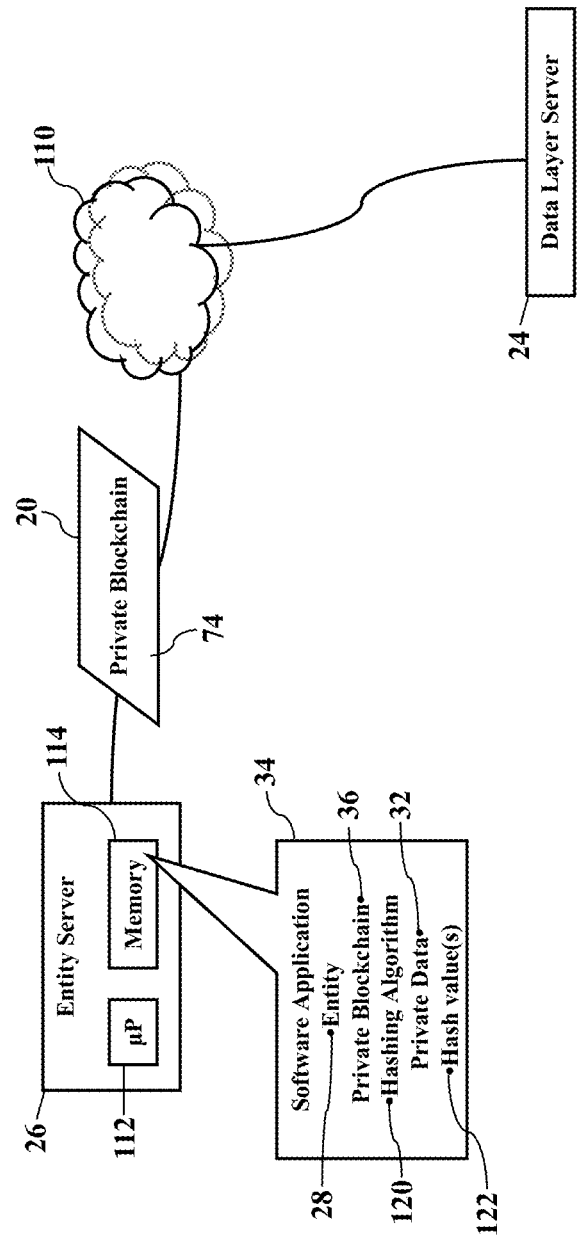
FIGS. 7-9 are more detailed illustrations of an operating environment, according to exemplary embodiments.
Figure 8:
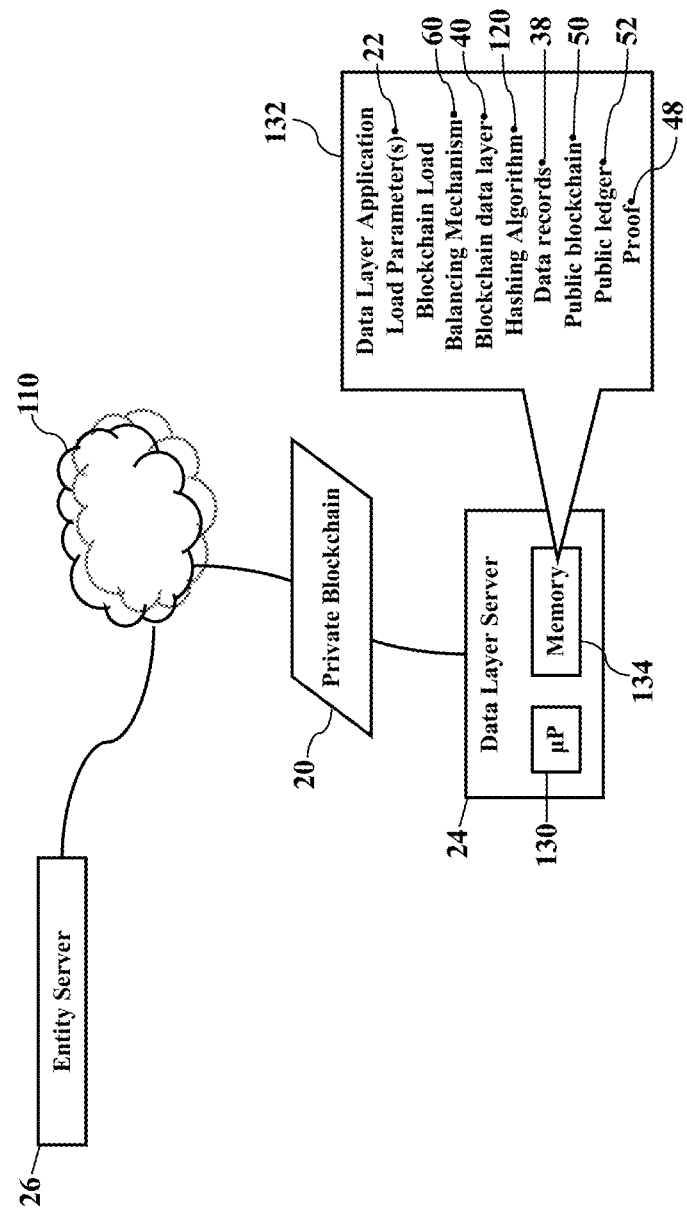
Figure 9:
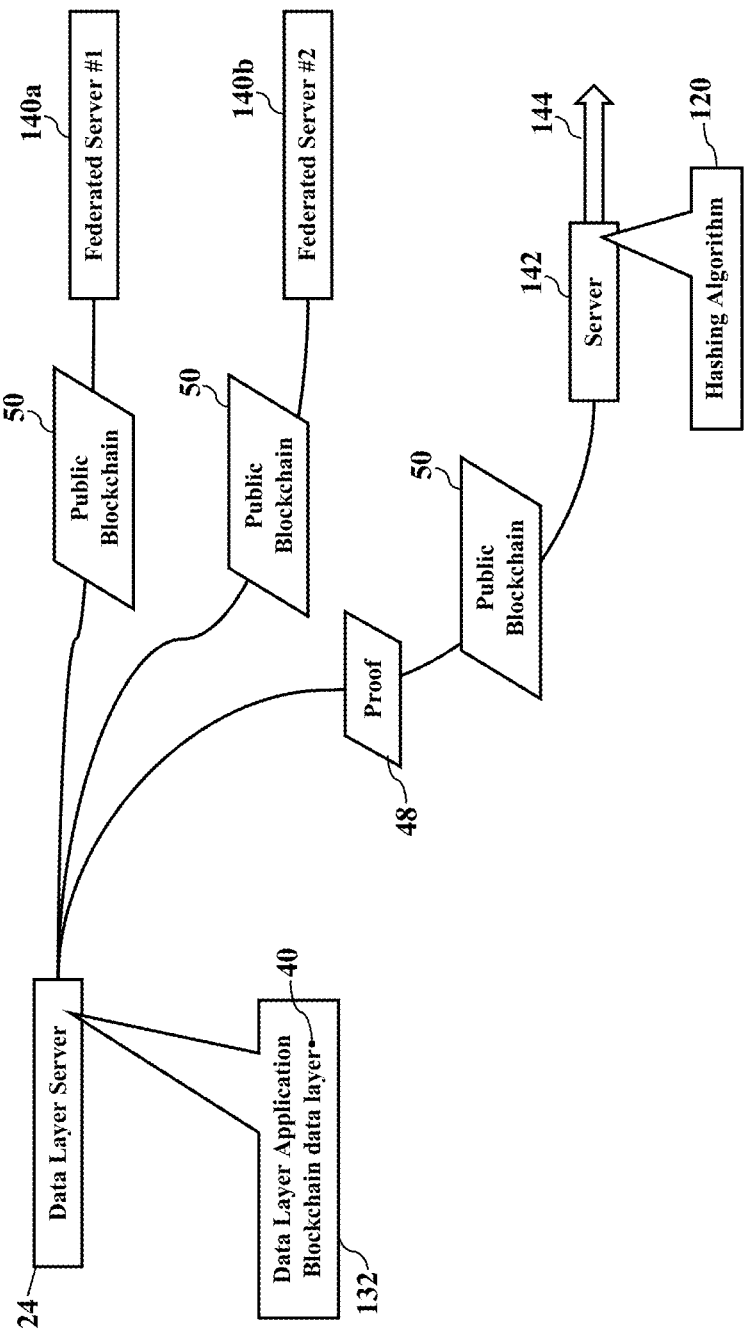

FIGS. 7-9 are more detailed illustrations of an operating environment, according to exemplary embodiments. FIG. 7 illustrates the entity server 26 communicating with a data layer server 24 via a communications network 110. The entity server 26 operates on behalf of the entity 28 and generates the entity's private blockchain 20. The entity server 26, in other words, has a processor 112 (e.g., "µP"), application specific integrated circuit (ASIC), or other component that executes the entity's software application 34 stored in a local memory device 114. The entity server 26 has a network interface to the communications network 110, thus allowing two-way, bidirectional communication with the data layer server 24. The entity's software application 34 includes instructions, code, and/or programs that cause the entity server 26 to perform operations, such as calling, invoking, and/or applying an electronic representation of a hashing algorithm 120 to the entity's private data 32. The hashing algorithm 120 thus generates one or more hash values 122, which are incorporated into the blocks 74 of data within the entity's private blockchain 20. The entity's software application 34 then instructs the entity server 26 to send the private blockchain 20 via the communications network 110 to any network address, such as an Internet protocol address associated with the data layer server 24.

FIG. 8 illustrates the blockchain data layer 40. The data layer server 24 has a processor 130 (e.g., "µP"), application specific integrated circuit (ASIC), or other component that executes a data layer application 132 stored in a local memory device 134. The data layer server 24 has a network interface to the communications network 110. The data layer application 132 includes instructions, code, and/or programs that cause the data layer server 24 to perform operations, such as receiving the entity's private blockchain 20. The data layer application 132 may then call or invoke the blockchain load balancing mechanism 60 (perhaps as a software module or via an API) to allocate resources (such as the processor 130 and/or the local memory device 134) to the private blockchain 20, perhaps according to the load parameter 22. The data layer application 132 causes the data layer server 24 to generate the blockchain data layer 40. The data layer application 132 may optionally call, invoke, and/or apply the hashing algorithm 120 to the data records 38 contained within the blockchain data layer 40. The data layer application 132 may also generate the public blockchain 50. The data layer application 132 may thus generate the public ledger 52 that publishes, records, or documents the cryptographic proof 48 of the blocks of data contained within the private blockchain 20.

FIG. 9 illustrates additional publication mechanisms. Once the blockchain data layer 40 is generated, the blockchain data layer 40 may be published in a decentralized manner to any destination. The data layer server 24, for example, may generate and distribute the public blockchain 50 (via the communications network 110 illustrated in FIGS. 7-8) to one or more federated servers 140. While there may be many federated servers 140, for simplicity FIG. 9 only illustrates two (2) federated servers 140*a* and 140*b*. The federated servers 140*a* and 140*b* provide a service and, in return, they are compensated according to a compensation or services agreement or scheme.

Exemplary embodiments include still more publication mechanisms. For example, the cryptographic proof 48 and/or the public blockchain 50 may be sent (via the communications network 110 illustrated in FIGS. 7-8) to a server 142. The server 142 may then add another, third layer of cryptographic hashing (perhaps using the hashing algorithm 120) and generate another or second public blockchain 144. While the server 142 and/or the public blockchain 144 may be operated by, or generated for, any entity, exemplary embodiments may integrate another cryptographic coin mechanism. That is, the server 142 and/or the public blockchain 144 may be associated with BITCOIN®, ETHEREUM®, RIPPLE®, or other cryptographic coin mechanism. The cryptographic proof 48 and/or the public blockchain 50 may be publically distributed and/or documented as evidentiary validation. The cryptographic proof 48 and/or the public blockchain 50 may thus be historically and publically anchored for public inspection and review.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. When the entity server 26 and the data layer server 24 communicate via the communications network 110, the entity server 26 and the data layer server 24 may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

Figure 10:
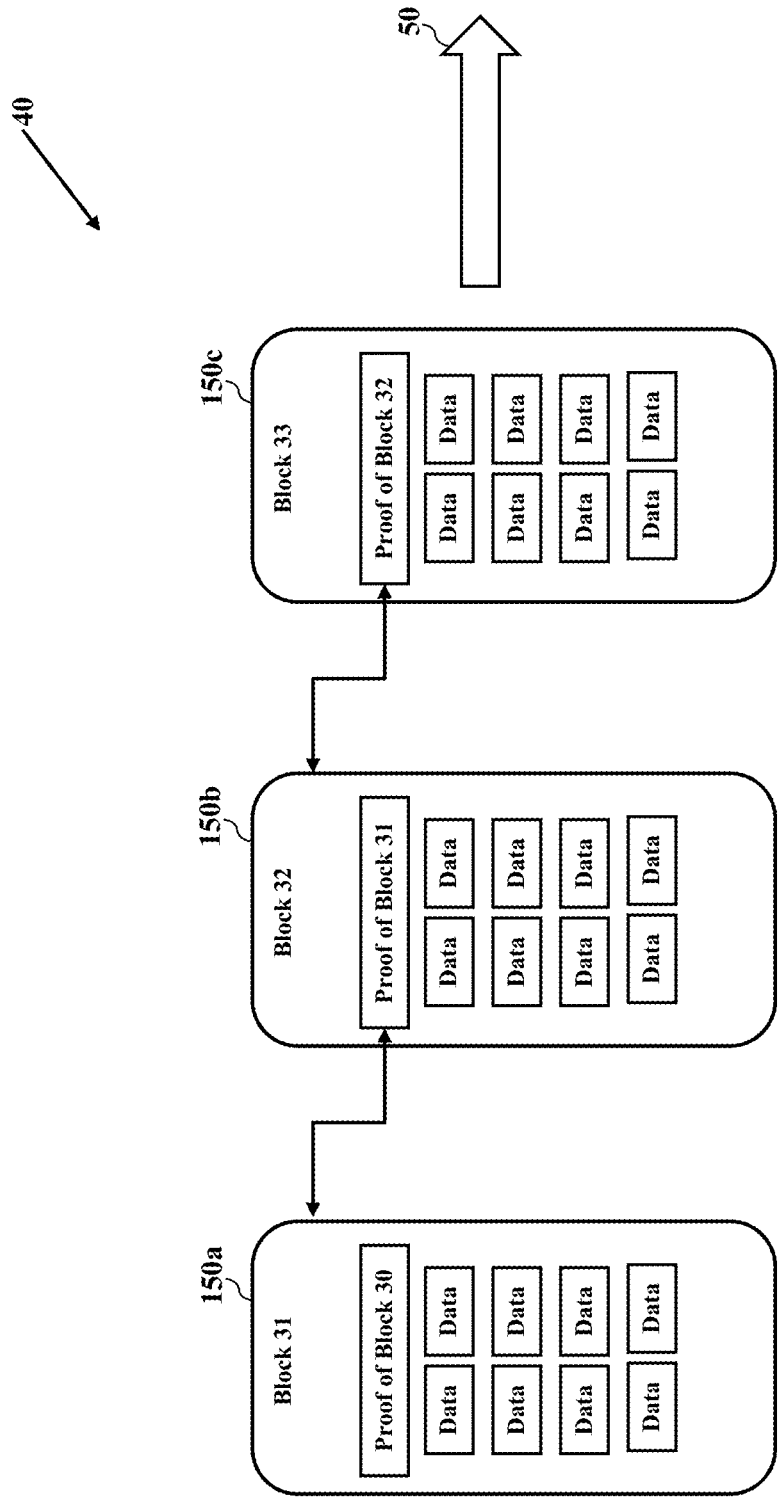
FIGS. 10-14 further illustrate the blockchain data layer 40, according to exemplary embodiments.

FIGS. 10-14 further illustrate the blockchain data layer 40, according to exemplary embodiments. The blockchain data layer 40 chains hashed directory blocks 150 of data into the public blockchain 50. For example, the blockchain data layer 40 accepts input data (such as the one or more private blockchains 20 illustrated in FIGS. 1-8) within a window of time. While the window of time may be configurable from fractions of seconds to hours, exemplary embodiments use ten (10) minute intervals. FIG. 10 illustrates a simple example of only three (3) directory blocks 150*a-c* of data, but in practice there may be millions or billions of different blocks. Each directory block 150 of data is linked to the preceding blocks in front and the following or trailing blocks behind. The links are created by hashing all the data within a single directory block 150 and then publishing that hash value within the next directory block.

Figure 11:
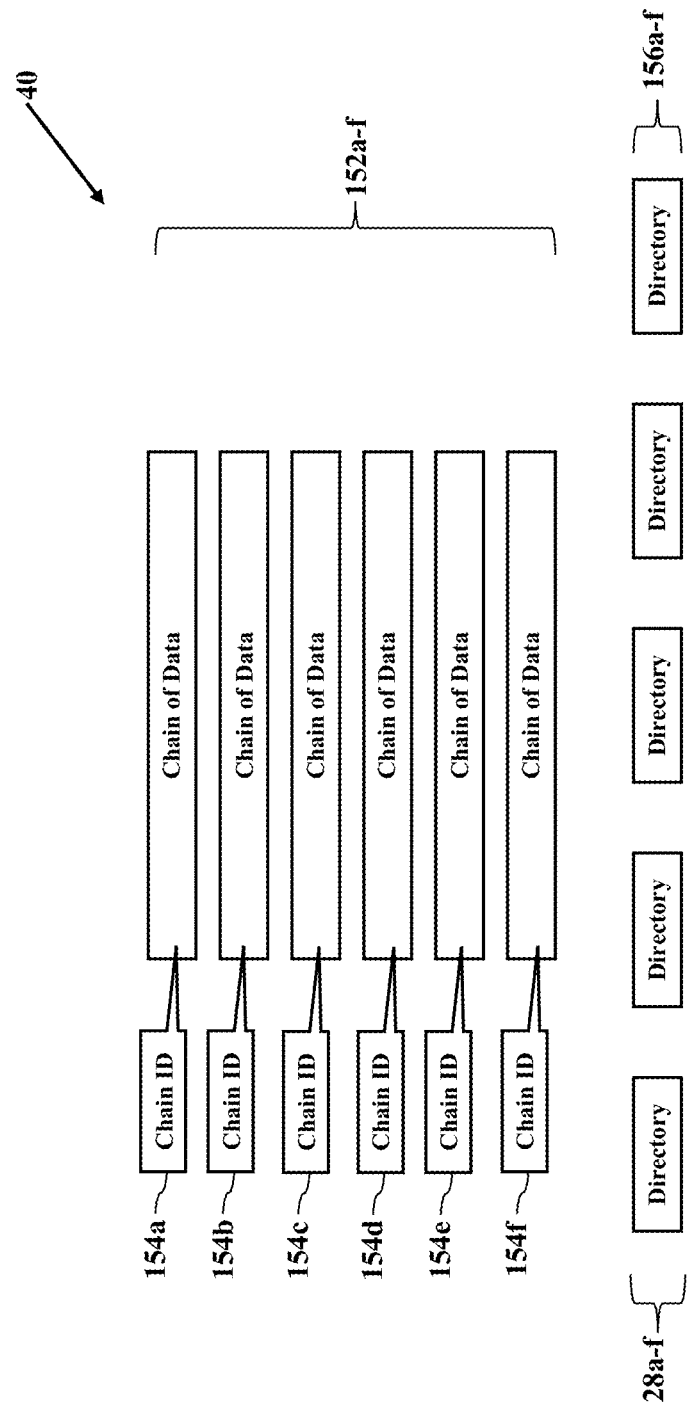

As FIG. 11 illustrates, published data may be organized within chains 152. Each chain 152 is created with an entry that associates a corresponding chain identifier 154. Each entity 28*a-f*, in other words, may have its corresponding chain identifier 154*a-d*. The blockchain data layer 40 may thus track any data associated with the entity 28*a-f* with its corresponding chain identifier 154*a-d*. New and old data in time may be associated with, linked to, identified by, and/or retrieved using the chain identifier 154*a-d*. Each chain identifier 154*a-d* thus functionally resembles a directory 156*a-d* (e.g., files and folders) for organized data entries according to the entity 28*a-f*.

Figure 12:
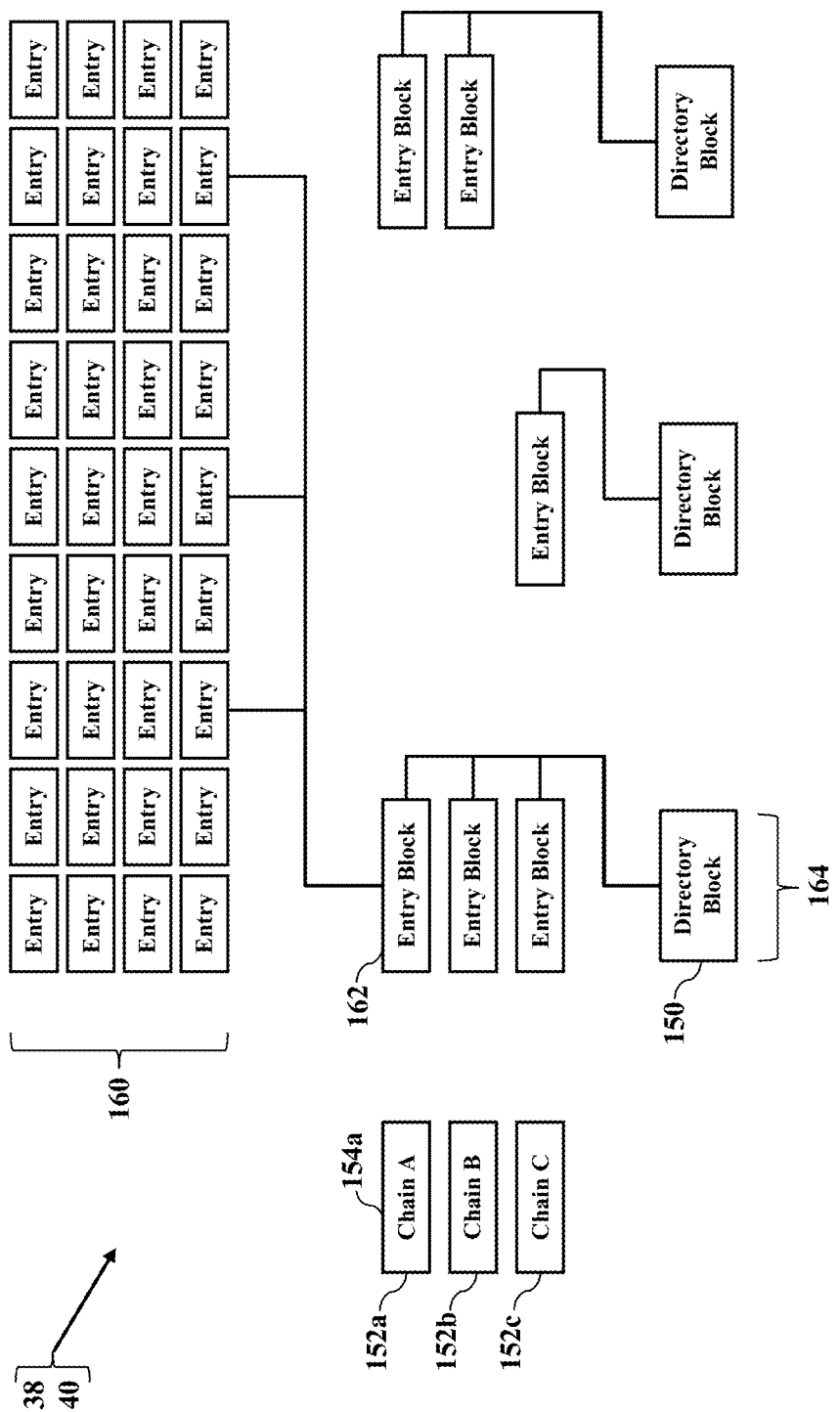

FIG. 12 illustrates the data records 38 in the blockchain data layer 40. As data is received as an input (such as the private blockchain(s) 20 illustrated in FIGS. 1-8), data is recorded within the blockchain data layer 40 as an entry 160. While the data may have any size, small chunks (such as 10 KB) may be pieced together to create larger file sizes. One or more of the entries 160 may be arranged into entry blocks 162 representing each chain 152 according to the corresponding chain identifier 154. New entries for each chain 152 are added to their respective entry block 162 (again perhaps according to the corresponding chain identifier 154). After the entries 160 have been made within the proper entry blocks 162, all the entry blocks 162 are then placed within in the directory block 150 generated within or occurring within a window 164 of time. While the window 164 of time may be chosen within any range from seconds to hours, exemplary embodiments may use ten (10) minute intervals. That is, all the entry blocks 162 generated every ten minutes are placed within in the directory block 150.

Figure 13:
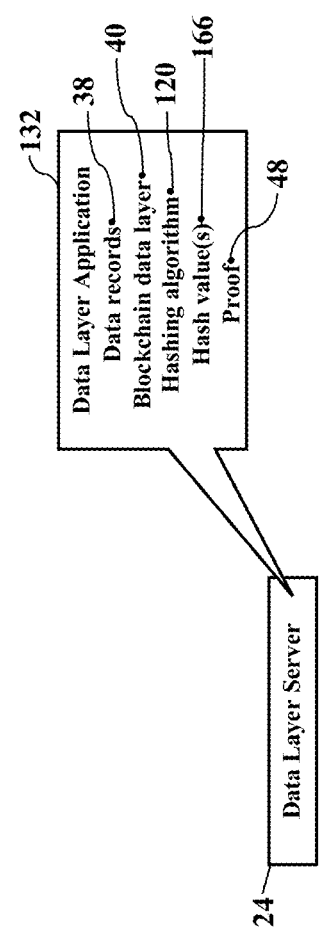

FIG. 13 illustrates cryptographic hashing. The data layer server 24 executes the data layer application 132 to generate the data records 38 in the blockchain data layer 40. The data layer application 132 may then instruct or cause the data layer server 24 to execute the hashing algorithm 120 on the data records 38 (such as the directory block 150 explained with reference to FIGS. 10-12). The hashing algorithm 120 thus generates one or more hash values 166 as a result, and the hash values 166 represent the hashed data records 38. As one example, the blockchain data layer 40 may apply a Merkle tree analysis to generate a Merkle root (representing a Merkle proof 48) representing each directory block 150. The blockchain data layer 40 may then publish the Merkle proof 48 (as this disclosure explains).

Figure 14:
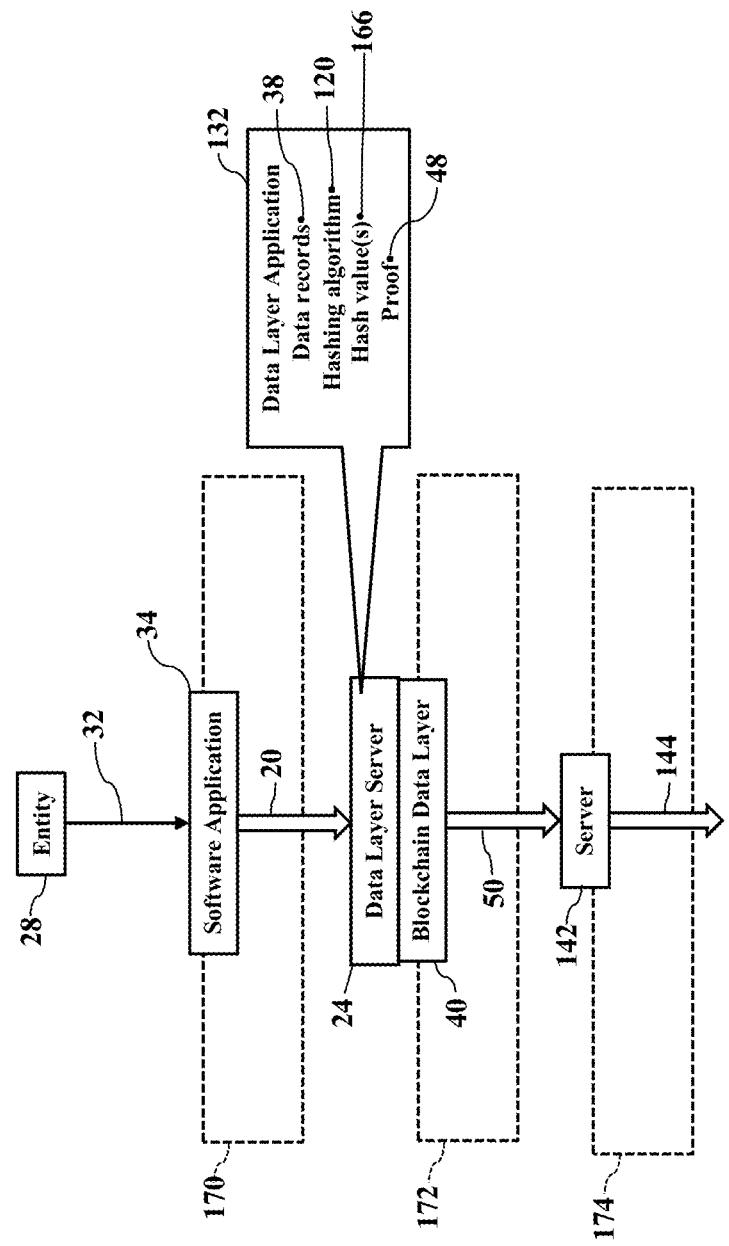

FIG. 14 illustrates hierarchical hashing. The entity's private software application 34 provides a first layer 170 of cryptographic hashing and generates the private blockchain 20. The entity 28 then sends its private blockchain 20 to the data layer server 24. The data layer server 24, executing the data layer application 132, generates the blockchain data layer 40. The data layer application 132 may optionally provide a second or intermediate layer 172 of cryptographic hashing to generate the cryptographic proof 48. The data layer application 132 may also publish any of the data records 38 as the public blockchain 50, and the cryptographic proof 48 may or may not also be published via the public blockchain 50. The public blockchain 50 and/or the cryptographic proof 48 may be optionally sent to the server 142 as an input to yet another public blockchain 144 (again, such as BITCOIN®, ETHEREUM®, or RIPPLE®) for a third layer 174 of cryptographic hashing and public publication. The first layer 170 and the second layer 172 thus ride or sit atop a conventional public blockchain 144 (again, such as BITCOIN®, ETHEREUM®, or RIPPLE®) and provide additional public and/or private cryptographic proofs 48.

Exemplary embodiments may use any hashing function. Many readers may be familiar with the SHA-256 hashing algorithm. The SHA-256 hashing algorithm acts on any electronic data or information to generate a 256-bit hash value as a cryptographic key. The key is thus a unique digital signature. There are many hashing algorithms, though, and exemplary embodiments may be adapted to any hashing algorithm.

FIGS. 15-18 illustrate the virtual computing environment, according to exemplary embodiments. Here the blockchain load balancing mechanism 60 manages the virtual machines ("VM") 80 that share the data layer server 24. Virtual computing is known, so this disclosure need not dwell on known details. Suffice it to say that the data layer server 24 may present or operate as the one or more virtual machines 80. That is, the entity servers 26a-c and/or their corresponding private blockchains 20a-c may share the capabilities of the processor 130 and the memory device 134 via the virtual machines 80.

Figure 15:
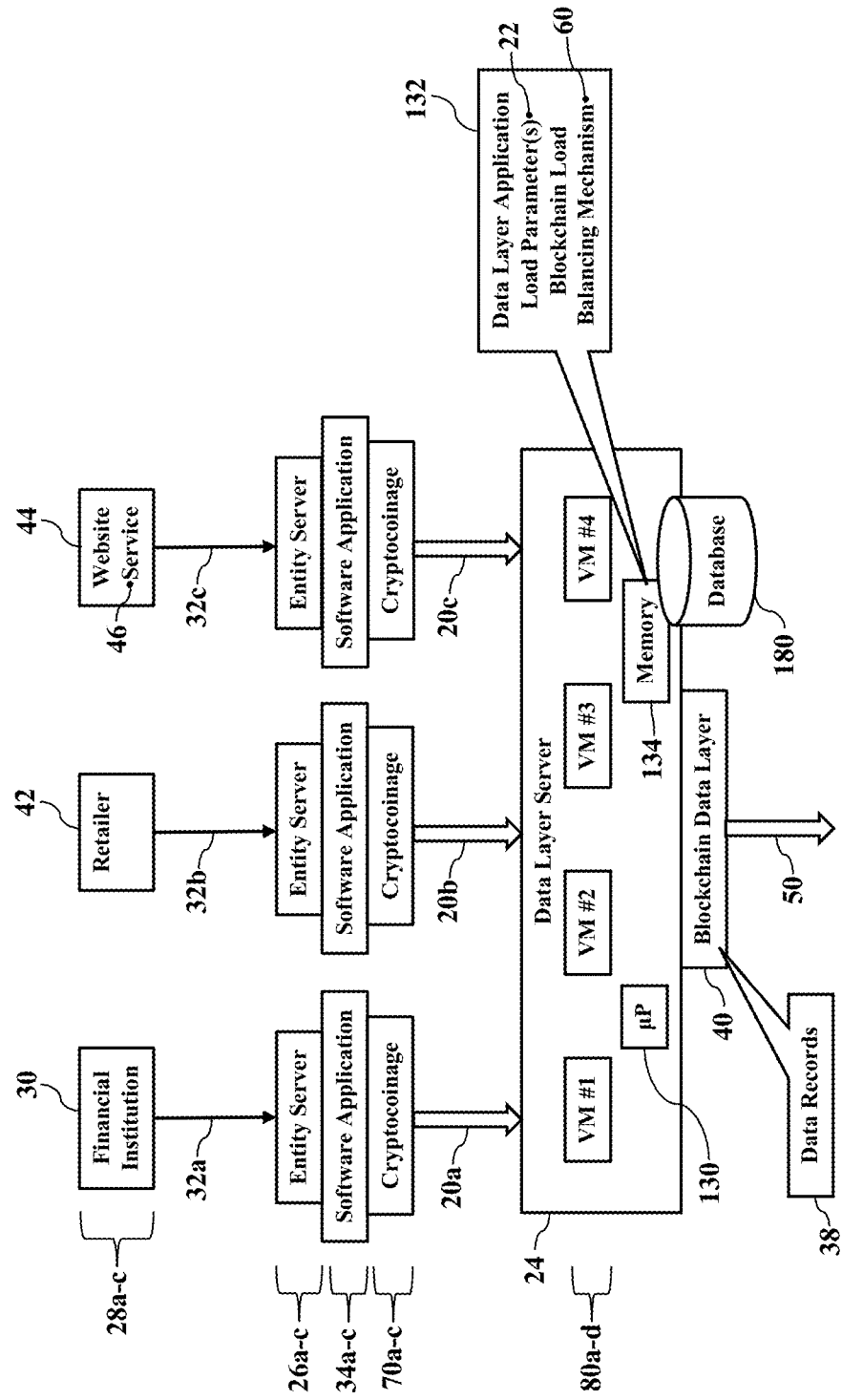
FIGS. 15-18 illustrate the virtual computing environment, according to exemplary embodiments.

Load balancing may be desired. The blockchain load balancing mechanism 60 may query an electronic database 180 to determine virtual assignments. That is, the blockchain load balancing mechanism 60 may assign or distribute any of the private blockchains 20 to a particular one of the virtual machines 80 according to the informational content within the electronic database 180. FIG. 15 illustrates the data layer server 24 locally storing the database 180 in its local memory device 134, but the electronic database 180 may be remotely stored and accessed via the communications network 110 (illustrated in FIGS. 7-8). Regardless, the data layer server 24 may query the database 180 for a query parameter and identify the corresponding virtual machine 80.

Figure 16:
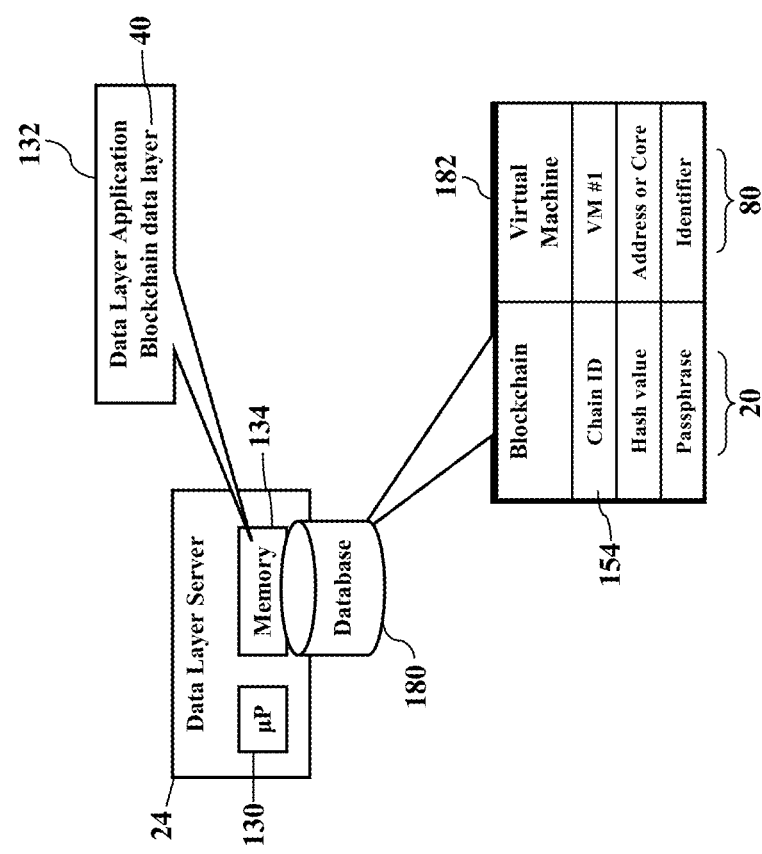

FIG. 16 illustrates the electronic database 180. Here the database 180 may define assignments between the private blockchains 20 and their corresponding virtual machine 80. While the database 180 may have any logical structure, FIG. 16 illustrates the database 180 as a table 182 that maps, converts, or translates the private blockchain 20 to its corresponding virtual machine 80. As a simple example, suppose the database 180 configured with entries that relate the chain ID 154 to its corresponding virtual machine 80. The blockchain load balancing mechanism 60 may instruct the data layer server 24 to query for the chain ID 154 and identify and/or retrieve an address, processor core, identifier, or other indicator assigned to the corresponding virtual machine 80. The database 180 may optionally contain entries that relate hashed values of the chain ID 154. Regardless, once the virtual machine 80 is identified, the blockchain load balancing mechanism 60 may direct or assign the private blockchain 20 to the virtual machine 80 for processing.

Figure 17:
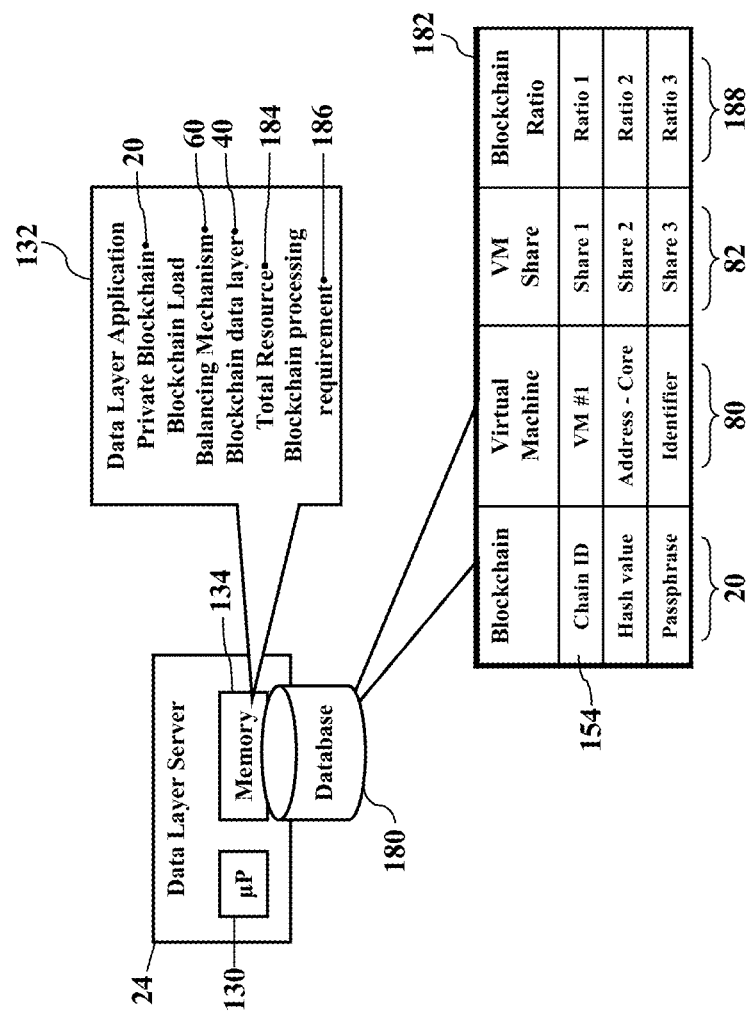

FIG. 17 further illustrates the database 180 of virtual machines. Here the database 180 of virtual machines may specify the share 82 assigned to each virtual machine 80. The data layer server 24 and/or the blockchain data layer 40 has a total resource capability or utilization 184 associated with the processor 130 and/or the memory device 134. There are many known measures and schemes for determining resource capability and utilization, and exemplary embodiments may utilize any of the known measures and schemes. For simplicity, then, thus disclosure will assume that the total resource capability or utilization 184 is one hundred percent (100%). Each virtual machine 80 may thus be assigned its corresponding share 82 of the total resource capability or utilization 184. The database 180 may thus be preconfigured or preloaded with entries that assign or associate each virtual machine 80 to its corresponding share 82. As the data layer server 24 receives one or more of the private blockchains 20, the blockchain load balancing mechanism 60 may determine a blockchain processing requirement 186 associated with the private blockchain 20. The blockchain processing requirement 186 may be the resources required of the processor 130 and/or the memory device 134 to process the private blockchains 20, to generate the blockchain data layer 40, and/or to compute or determine any other value or measure (such as the data records 38 and/or the rate 78 of the financial transactions, as explained with reference to FIG. 2). For example, the blockchain load balancing mechanism 60 may compute or determine a blockchain ratio 188 of the blockchain processing requirement 186 to the total resource capability or utilization 184 available from the data layer server 24. The blockchain load balancing mechanism 60 may query the database 180 for the blockchain ratio 188 to identify the corresponding virtual machine 80. Exemplary embodiments may thus determine whether the blockchain ratio 188 matches any of the shares 82 specified by the database 180. Once the virtual machine 80 is identified, the blockchain load balancing mechanism 60 may direct or assign the private blockchain 20 to the corresponding virtual machine 80 for processing. Each private blockchains 20 may thus be assigned a processing bandwidth or slice of the data layer server 24 according to its processing load or burden.

Figure 18:
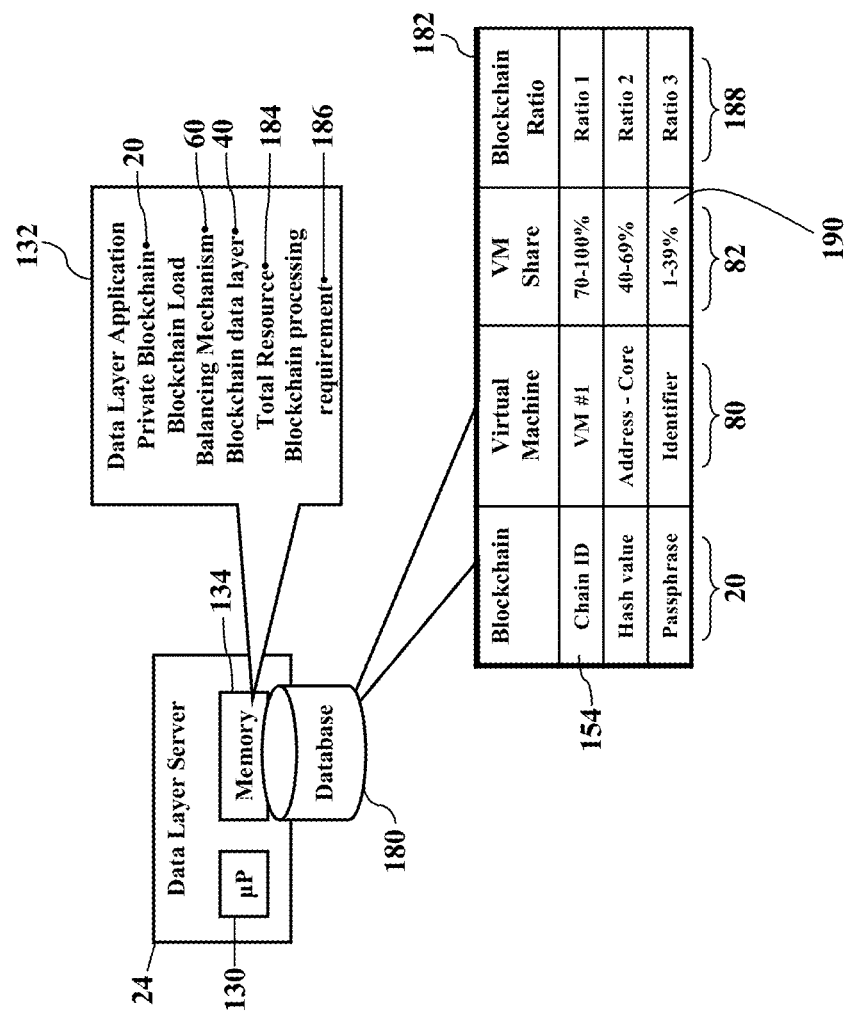

FIG. 18 further illustrates the database 180. Here the database 180 may specify the shares 82 as ranges 190 of values. One virtual machine 80, for example, may be assigned to private blockchains 20 requiring heavy, disproportionate, or abnormally large use of the data layer server 24 and/or the blockchain data layer 40. Another one of the virtual machines 80, as another example, may be assigned to private blockchains 20 requiring medium, intermediate, or historically average use of the data layer server 24 and/or the blockchain data layer 40. Still another virtual machine 80 may be reserved for the private blockchains 20 that only require light, low, or historically below average use of the data layer server 24 and/or the blockchain data layer 40. As the data layer server 24 receives any of the private blockchains 20, the blockchain load balancing mechanism 60 may again compute or determine the blockchain ratio 188 and consult the database 180. If the blockchain ratio 188 lies within, matches, or favorably compares to any of the ranges 190 of the shares 82 specified by the database 180, then the blockchain load balancing mechanism 60 directs the private blockchain 20 to the corresponding virtual machine 80.

Figure 19:
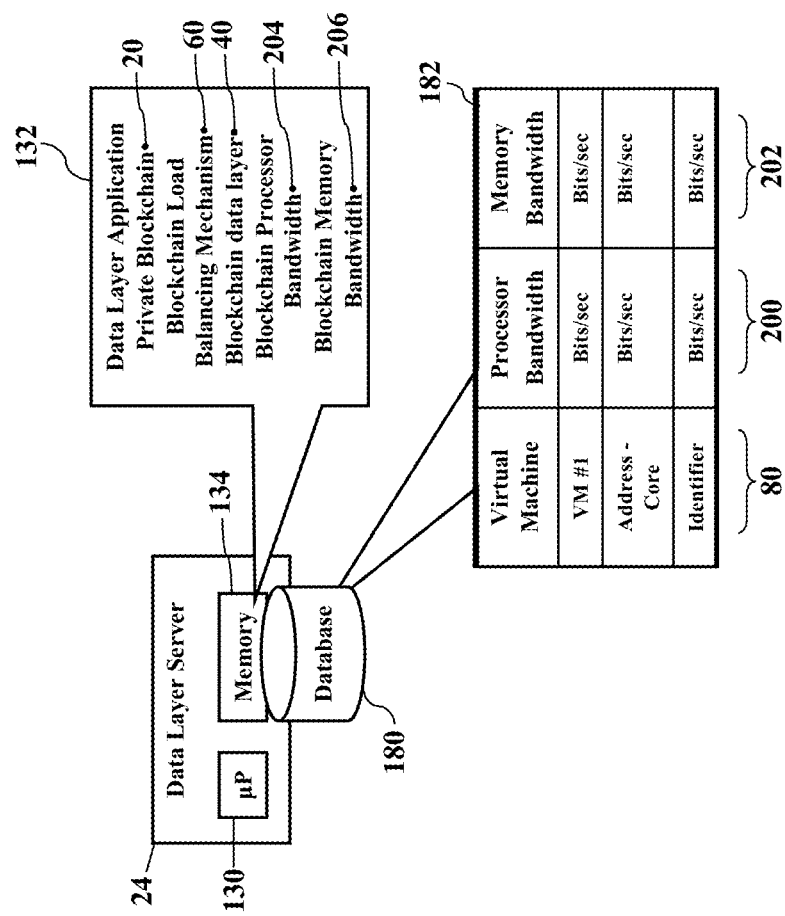
FIGS. 19-20 illustrate bandwidths, according to exemplary embodiments.
Figure 20:
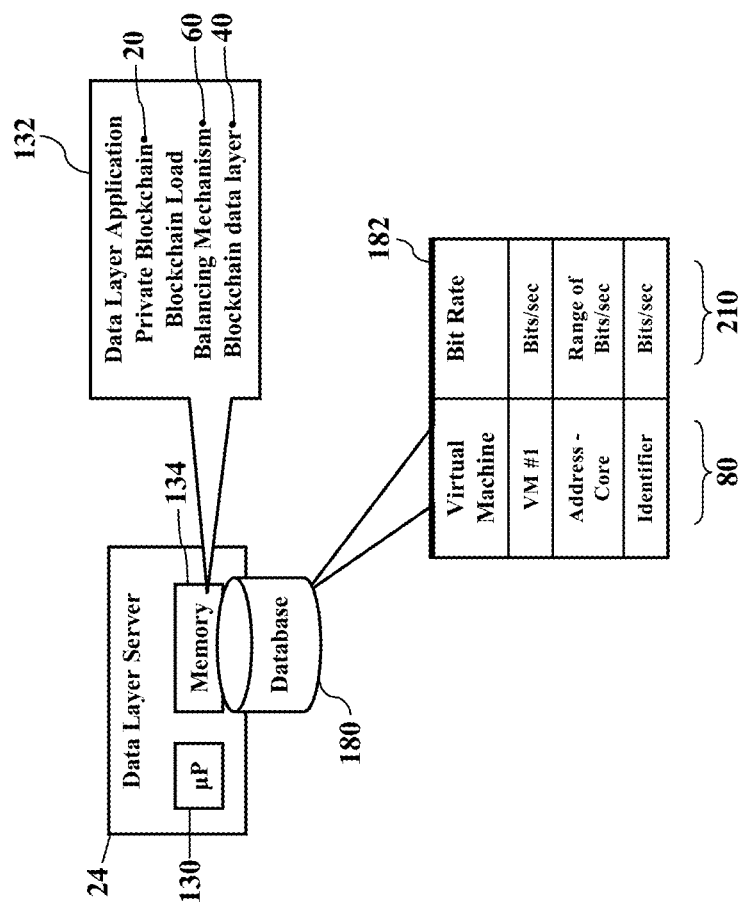

FIGS. 19-20 illustrate bandwidths, according to exemplary embodiments. Here the blockchain load balancing mechanism 60 may assign the private blockchain 20 based on bit processing capabilities. The processor 130 within the data layer server 24 may have a limited capability to accept and/or process bits of information. When the private blockchain 20 is received, the private blockchain 20 may be represented by bits or bytes. Sometimes the number of bits/bytes received may exceed the number of bits/bytes that cab be serially or sequentially processed by the processor 130. Similarly, the memory device 134 may also have a limited capability to accept and/or process bits or bytes. Indeed, it may be common for the data layer server 24 to allocate or set aside a portion of the memory device 134 as a cache memory for an overflow of bits/bytes. The blockchain load balancing mechanism 60 may thus establish a processor bandwidth 200 specifying a permissible amount of bits/second that may be received, accepted, and/or processed by the processor 130. The blockchain load balancing mechanism 60 may also retrieve or identify a memory bandwidth 202 specifying a permissible amount of bits/second that may be received, accepted, and/or processed by the memory device 134.

The database 180 may specify the bandwidths. The database 180 may be preloaded or preconfigured with the processor bandwidth 200 and/or the memory bandwidth 202 assigned to each virtual machine 80. As the data layer server 24 receives the private blockchain 20, the data layer application 132 (executing or applying the blockchain load balancing mechanism 60) may determine the corresponding blockchain processor bandwidth 204 (perhaps in bits per second) that is required of the processor 130 to process the private blockchain 20. The blockchain load balancing mechanism 60 may also determine the corresponding blockchain memory bandwidth 206 (perhaps in bits per second) that is required of the memory device 134 to process the private blockchain 20. The blockchain load balancing mechanism 60 may query the database 180 for the blockchain processor bandwidth 204 and/or the blockchain memory bandwidth 206 to identify the corresponding virtual machine 80. If the blockchain processor bandwidth 204 and/or the blockchain memory bandwidth 206 match or satisfy a range of values associated with an entry, then the blockchain load balancing mechanism 60 may assigned the private blockchain 20 to the corresponding virtual machine 80. Once the virtual machine 80 is identified, the blockchain load balancing mechanism 60 may establishes any other parameters for processing.

FIG. 20 illustrates a bit rate 210. Because the blockchain load balancing mechanism 60 may determine or count the bits per second, the virtual machines 80 may be assigned based on the bit rate 210. As the data layer server 24 receives the private blockchain 20, the data layer application 134 (executing or applying the blockchain load balancing mechanism 60) may determine the bit rate 210 of the private blockchain 20. The bit rate 210 may represent the bits per second during a receipt of the private blockchain 20 (such as by the network interface, by the processor 130, and/or by the memory device 134). Exemplary embodiments may count the bits received and compare to the entries in the electronic database 180. If the database 180 has an entry that matches or satisfies the bit rate 210 and/or a range of the bit rate 210, exemplary embodiments identify the corresponding virtual machine 80. Once the virtual machine 80 is identified, the blockchain load balancing mechanism 60 may direct or assign the private blockchain 20 to the virtual machine 80 for processing.

The bit rate 210 may thus determine the virtual machine 80. One of the virtual machines 80 may be reserved for private blockchains 20 having a heavy, disproportionate, or abnormally large bit rate 210. Another virtual machine 80 may be reserved for private blockchains 20 having a medium, intermediate, or historically average bit rate 210. Still another one of the virtual machines 80 may be reserved for the private blockchains 20 having a light, low, or historically below average bit rate 210. The resources available from the data layer server 24 and/or the blockchain data layer 40 may be assigned based on slices or portions as determined by the bit rate 210.

Figure 21:
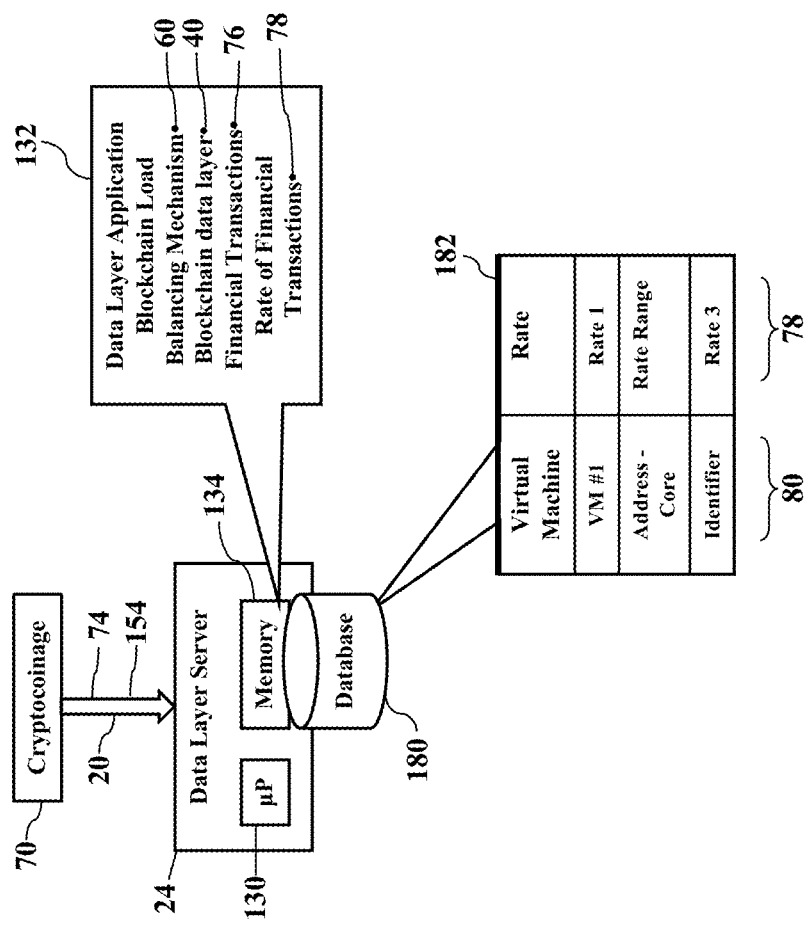
FIG. 21 illustrates financial transactions per second, according to exemplary embodiments.

FIG. 21 illustrates the financial transactions 76 per second, according to exemplary embodiments. Here the blockchain load balancing mechanism 60 may assign the virtual machine 80 based on the rate 78 of the financial transactions 76 per second represented by the private blockchain 20. As this disclosure previously explained, the private blockchain 20 may represent one or more financial transactions 76 involving the entity's private cryptocoinage 70. Each different financial transaction 76 may be represented by a unique or different hash value recorded in the block 74 of data incorporated into the private blockchain 20. Each different financial transaction 76 may additionally or alternatively be represented by a unique identifier or address (such as the chain ID 154, or other indicator. Regardless, as the private blockchain 20 is received, the blockchain load balancing mechanism 60 may inspect, read, or view the blocks 74 of data and count or sum the number of the transactions 74 per second. Exemplary embodiments may then query or consult the database 180 to determine the corresponding virtual machine 80. As FIG. 21 illustrates, the electronic database 180 may have entries that map or electronically associate different values or ranges of the rate 78 to their corresponding virtual machine(s) 80. If the database 180 has an entry that matches or satisfies the rate 78 of the financial transactions 76, exemplary embodiments identify the corresponding virtual machine 80. Once the virtual machine 80 is identified, the blockchain load balancing mechanism 60 may direct or assign the private blockchain 20 to the virtual machine 80 for processing.

The rate 78 of the financial transactions 76 may thus determine the virtual machine 80. One of the virtual machines 20 may be reserved for private blockchains 20 having a heavy, disproportionate, or abnormally large number of the transactions 76 per second. Another virtual machine 80 may be reserved for private blockchains 20 having a medium, intermediate, or historically average number of the transactions 76 per second. Another virtual machine 80 may be reserved for the private blockchains 20 having a light, low, or historically below average number of the transactions 76 per second. The resources available from the data layer server 24 and/or the blockchain data layer 40 may be assigned based on slices or portions as determined by the cryptocoinage transactions 76 per second.

The private cryptocoinage 70 may be required to access the private blockchain 20. The entity 28, for example, may require that a user spend or redeem a credit token (not shown for simplicity) of the private cryptocoinage 70. The user, for example, may burn one or more of credit tokens to access the blocks of data and/or hash values incorporated into the private blockchain 20. The credit token may or may not be transferrable, depending on policies established by the entity 28. A tradeable token (again not shown for simplicity) may also be established, and the tradeable token may be bought, sold, and/or earned, again according to the policies established by the entity 28. Regardless, the private cryptocoinage 70 must be consumed to access, read, or otherwise use the entity's private blockchain 20.

Figure 22:
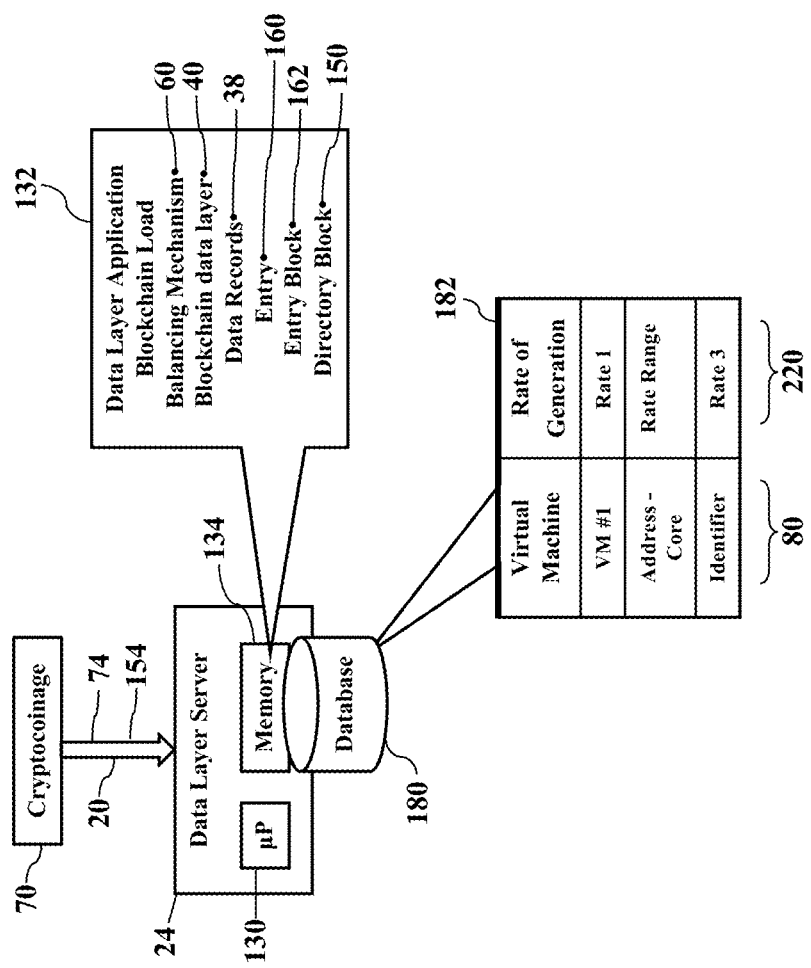
FIG. 22 illustrates allocations based on a blockchain data layer, according to exemplary embodiments.

FIG. 22 illustrates allocations based on the blockchain data layer 40, according to exemplary embodiments. As this disclosure previously explained, the data layer server 24 receives the private blockchain 20 and generates the data records 38 representing the blockchain data layer 40 (such as the entries 160, entry blocks 162, and/or the directory blocks 150 explained with reference to FIGS. 10-12). The blockchain load balancing mechanism 60 may thus assign the virtual machine 80 based on the number of the entries 160, the entry blocks 162, and/or the directory blocks 150 associated with the private blockchain 20. For example, as the data records 38 are generated, the blockchain load balancing mechanism 60 may determine a rate 220 of generation. That is, as the data records 38 are generated for any private blockchain 20, exemplary embodiments may sum or count the entries 160, the entry blocks 162, and/or the directory blocks 150 that are generated over time (such as per second, per minute, or other interval). The blockchain load balancing mechanism 60, for example, calls or initializes a counter having an initial value (such as zero). At an initial time, the counter commences or starts counting or summing the number of the entries 160, entry blocks 162, and/or the directory blocks 150 (generated within the blockchain data layer 40) that are commonly associated with or reference the private blockchain 20 (perhaps according to the chain ID 154 representing the entity's private cryptocoinage 70). The counter stops counting or incrementing at a final time and exemplary embodiments determine or read the final value or count. Exemplary embodiments may then calculate the rate 220 of generation as the sum or count over time and consult or query the electronic database 180 for the rate 220 of generation. The electronic database 180 may thus define entries that map or associate different rates 220 of generation and/or ranges to their corresponding virtual machines 80. If the database 180 of virtual machines has an entry that matches or satisfies the rate 220 of generation, exemplary embodiments identify the corresponding virtual machine 80. Once the virtual machine 80 is identified, the blockchain load balancing mechanism 60 may direct or assign the private blockchain 20 to the virtual machine 80 for processing.

The rate 220 of generation may thus be a feedback mechanism. As the private blockchains 20 are received, the rate 220 of generation of the data records 38 may determine the virtual machine 80 assigned adequate capacity or bandwidth. Again, one of the virtual machines 20 may be reserved for private blockchains 20 having a heavy, disproportionate, or abnormally large rate 220 of generation. Another virtual machine 80 may be reserved for private blockchains 20 having a medium, intermediate, or historically average rate 220 of generation. Another virtual machine 80 may be reserved for the private blockchains 20 having a light, low, or historically below average rate 220 of generation. The rate 220 of generation may thus be a gauge or measure of which virtual machine 80 is assigned the resources that process the private blockchain 20.

Figure 23:
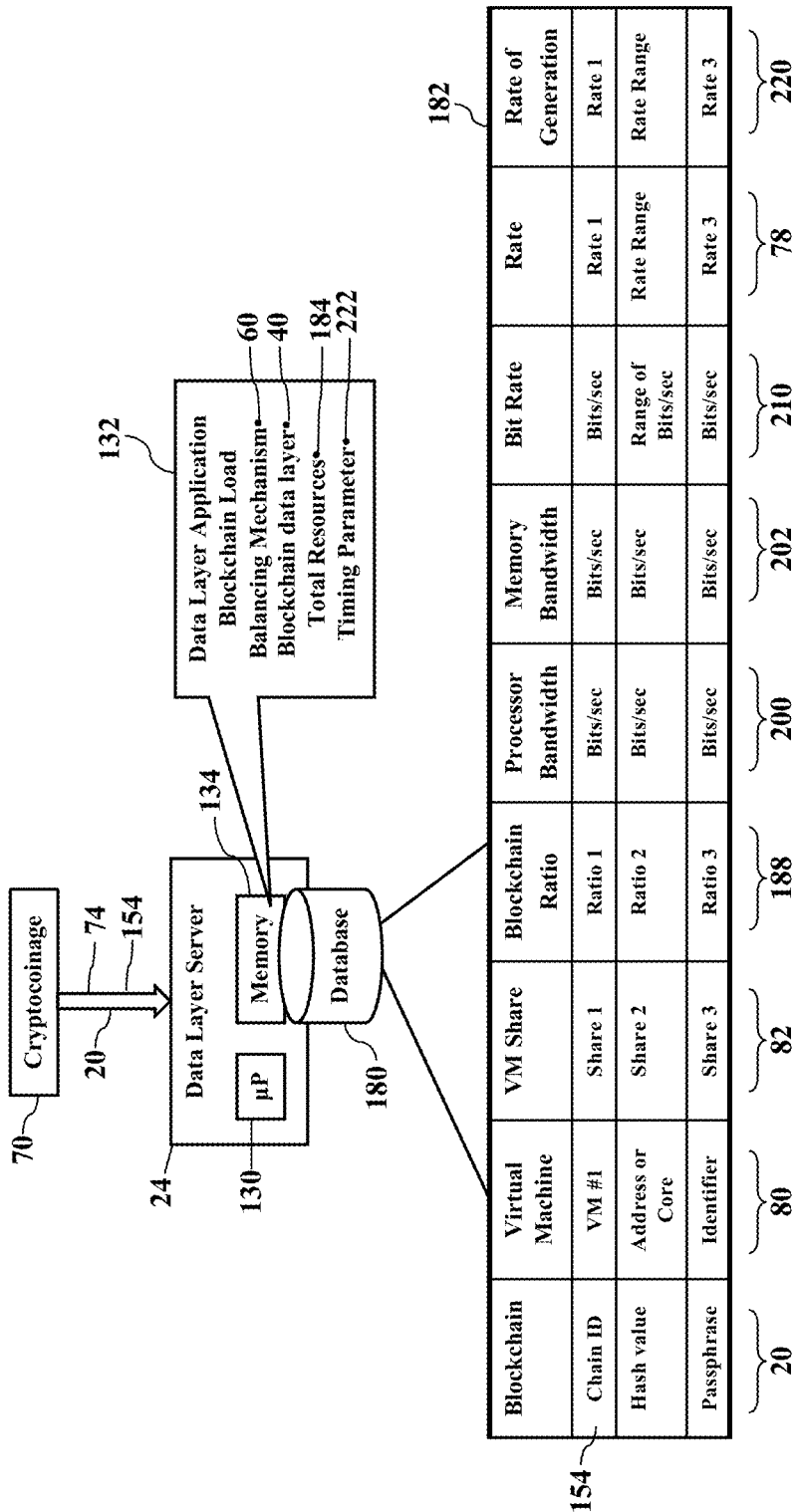
FIG. 23 illustrates dynamic operation, according to exemplary embodiments.

FIG. 23 illustrates dynamic operation, according to exemplary embodiments. As the data layer server 24 operates, the volume or number of the private blockchains 20 may increase or decrease over time. Sometimes many different private blockchains 20 are fed as inputs to the data layer server 24, and at other times only a few or a single private blockchain 20 is received. In other words, as the private blockchains 20 start, stop, and/or terminate as inputs, the chain ID(s) 154 and/or the blocks 74 of data will dynamically change. Moreover, as time progresses, other parameters affecting the blockchain load balancing mechanism 60 may additionally or alternatively change. For example, the blockchain ratio 188, the processor bandwidth 200 and the memory bandwidth 202, and the total resources 184 available from the data layer server 24 may dynamically change. The bit rates 210, the rate 78, and/or the rate 220 of generation may also dynamically change (as this disclosure above explained). The blockchain load balancing mechanism 60 may thus dynamically re-evaluate the assignments of the virtual machines 80 according to a timing parameter 222. The timing parameter 222 may have any value, or range of values, from fractions of a second (e.g., picoseconds) to hours. The blockchain load balancing mechanism 60 may thus execute or re-execute according to the timing parameter 222. As a simple example, the blockchain load balancing mechanism 60 may call or initialize a timer that starts incrementing or decrementing from an initial value at an initial time. The timer may then expire at a final time. The blockchain load balancing mechanism 60 may evaluate any assignment of the virtual machine 80 as the timer increments or at the expiration. Regardless, when the timer reinitializes and again begins, the blockchain load balancing mechanism 60 may repeat the assignment of the virtual machine 80.

Figure 24:
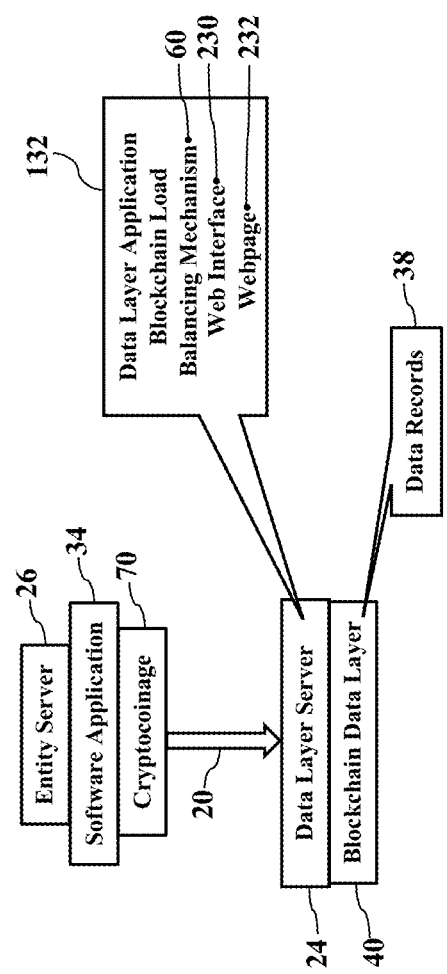
FIGS. 24-25 illustrate web access, according to exemplary embodiments.
Figure 25:
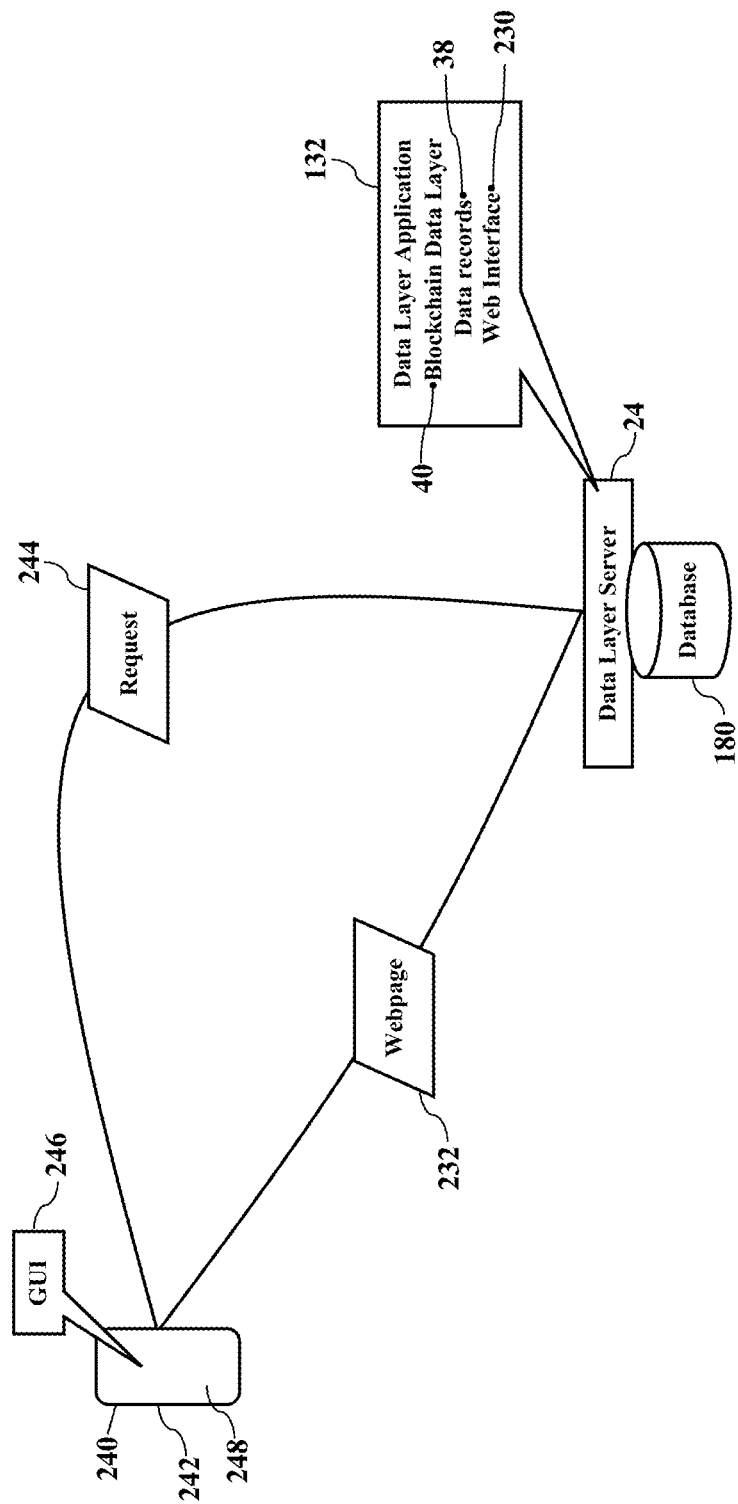

FIGS. 24-25 illustrate web access, according to exemplary embodiments. Here the blockchain load balancing mechanism 60 may be accessed and configured via the communications network 110 (such as the Internet, as illustrated with reference to FIGS. 7-8). FIG. 24 thus illustrates the blockchain load balancing mechanism 60 as a software-as-a-service offered by the secure data layer server 24. The blockchain load balancing mechanism 60, for example, may be a module within, or called by, the data layer application 132. A user accesses the blockchain load balancing mechanism 60 to define the various parameters governing load balancing. While the blockchain load balancing mechanism 60 may have any access mechanism, FIG. 24 illustrates a web interface 230. That is, the blockchain load balancing mechanism 60 may be accessed via a webpage 232. The webpage 232 prompts the user to input or to select one or more parameters governing the blockchain load balancing mechanism 60.

FIG. 25 further illustrates the web interface 230. The user accesses the blockchain load balancing mechanism 60 using a user device 240. While the user device 240 may be any processor-controlled device, most readers are familiar with a smartphone 242. If the smartphone 242 correctly sends authentication credentials, then the smartphone 242 may utilize the web interface 230 to the data layer server 24 and/or the blockchain data layer 40. The smartphone 242 executes a web browser and/or a mobile application to send a request 244 specifying an address or domain name associated with or representing the data layer server 24 and/or the blockchain load balancing mechanism 60. The web interface 230 to the data layer server 24 thus sends the webpage 232 as a response, and the user's smartphone 242 downloads the webpage 232. The smartphone 242 has a processor and memory device that executes (not shown for simplicity) that causes a display of the webpage 232 as a graphical user interface (or "GUI") 246 on its display device 248. The GUI 246 may generate one or more prompts or fields for specifying the parameters defining the blockchain load balancing mechanism 60. As one example, the webpage 232 may have prompts or fields for specifying the entries in the electronic database 180. Once the parameters or entries are specified, the blockchain load balancing mechanism 60 may commence operation.

Figure 26:
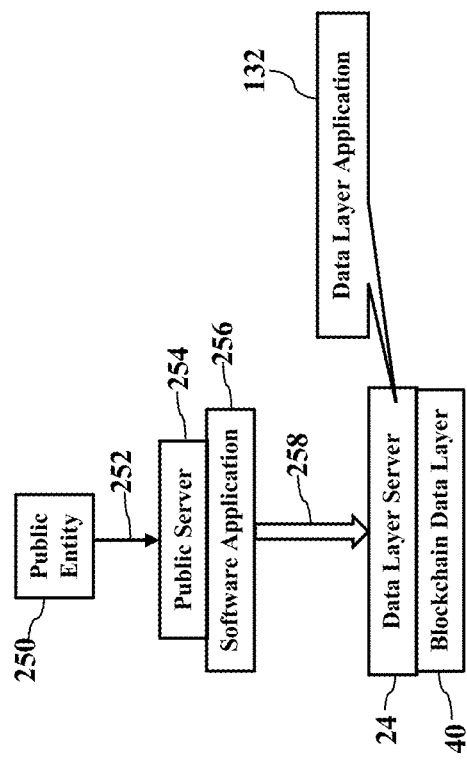
FIG. 26 illustrates a public entity, according to exemplary embodiments.

FIG. 26 illustrates a public entity 250, according to exemplary embodiments. Here exemplary embodiments may be applied to any public data 252 generated by the public entity 250. The public entity 250 may be a city, state, or federal governmental agency, but the public entity 250 may also be a contractor, non-governmental organization, or other actor that acts on behalf of the governmental agency. The public entity 250 operates its corresponding public server 254 and applies its software application 256 to its public data 252 to generate its governmental blockchain 258. The data layer server 24 receives the governmental blockchain 258 and generates the blockchain data layer 40. The data layer server 24 may also execute the blockchain load balancing mechanism 60 to share resources between the governmental blockchain 238a-b, as this disclosure explains.

Figure 27:
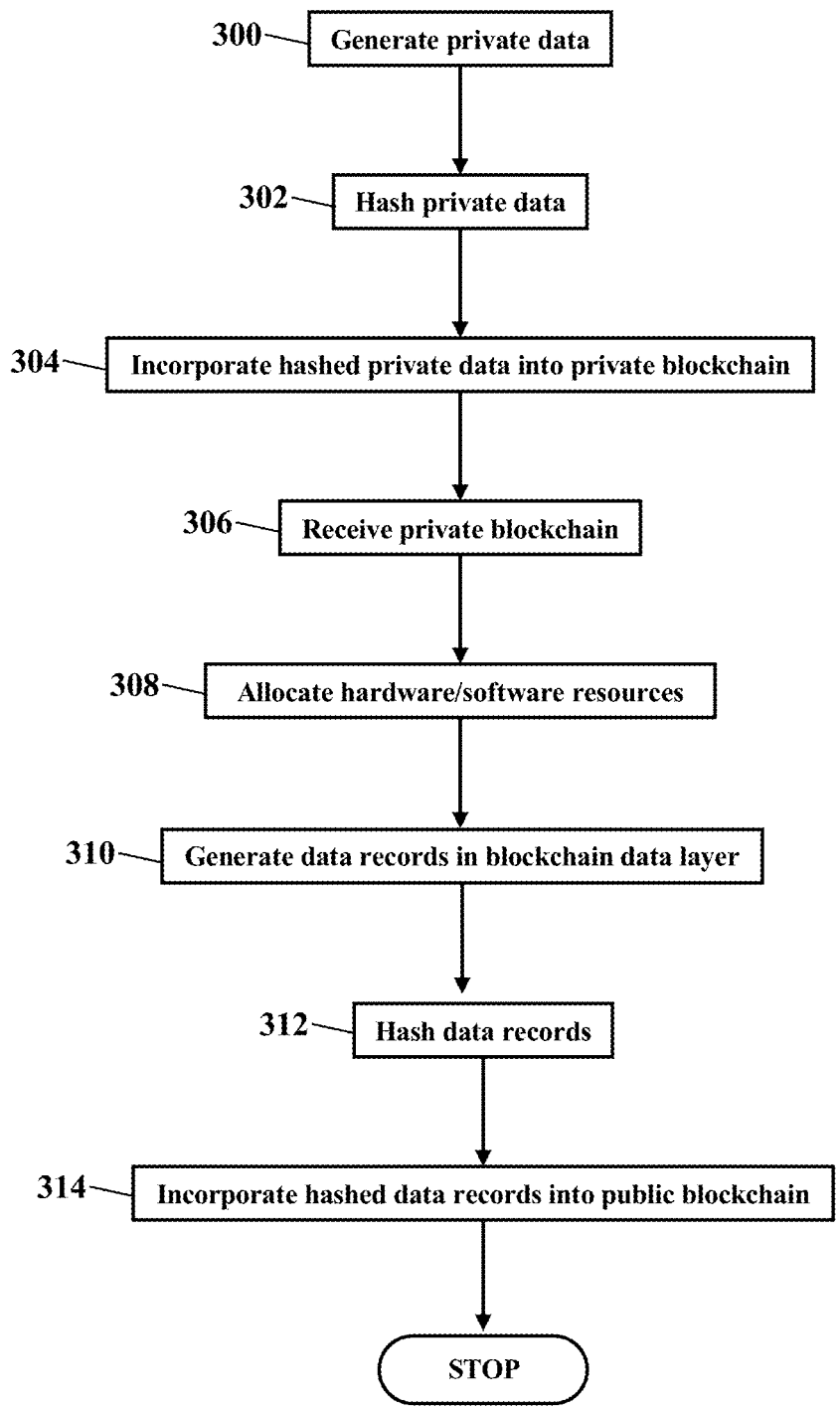
FIG. 27 is a flowchart illustrating a method or algorithm for load balancing of blockchains, according to exemplary embodiments.

FIG. 27 is a flowchart illustrating a method or algorithm for load balancing of the blockchains 20 and 258, according to exemplary embodiments. The electronic private data 32 is generated (Block 300), hashed (Block 302), and incorporated into the private blockchain 20 (Block 304). The private blockchain 20 is received by the data layer server 24 (Block 306) and the blockchain load balancing mechanism 60 allocates resources (Block 308). The data records 38 in the blockchain data layer 40 are generated (Block 310). The data records 38 in the blockchain data layer 40 may be hashed (Block 312) and incorporated into the public blockchain 50 (Block 314).

Figure 28:
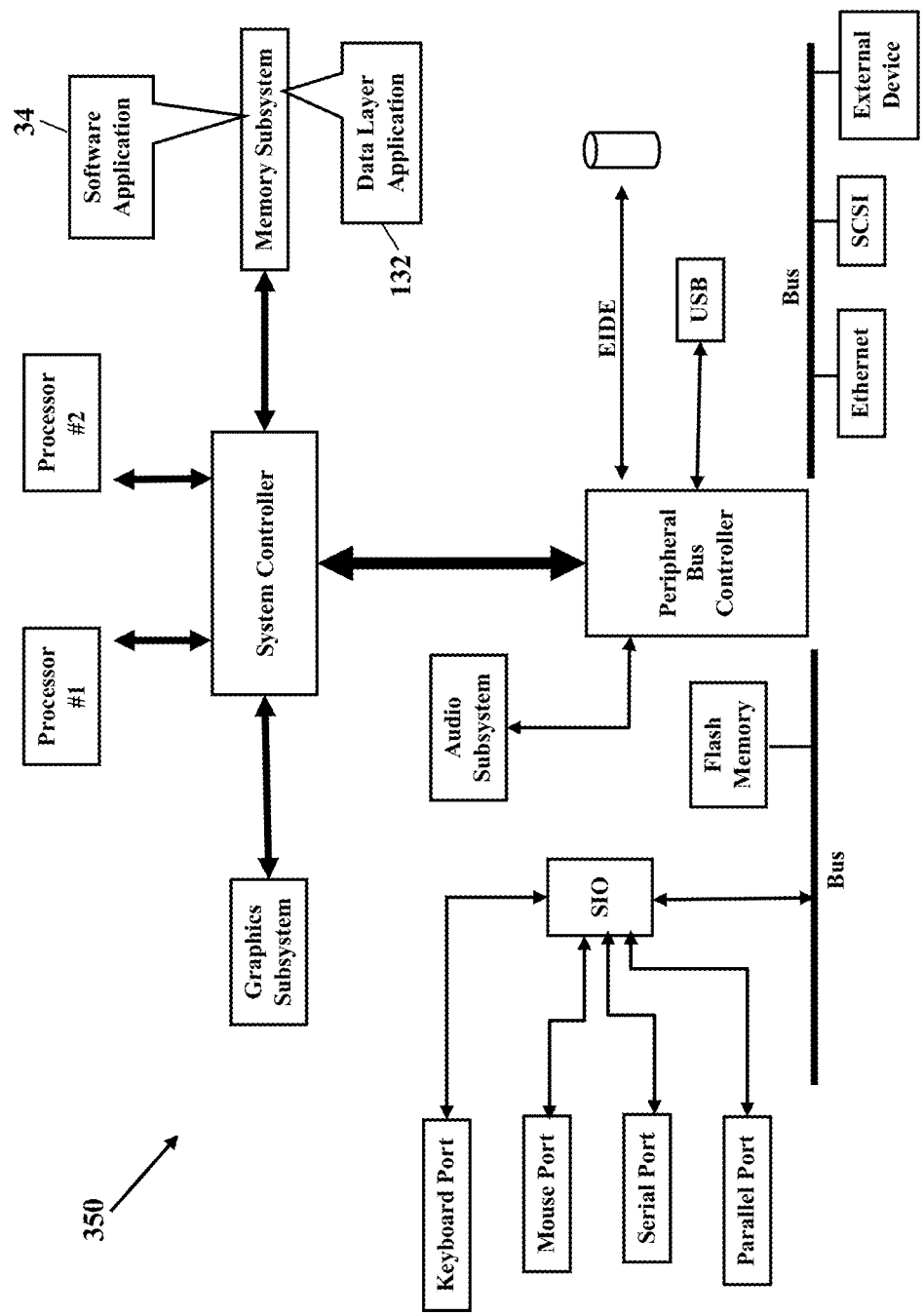
FIGS. 28-29 depict still more operating environments for additional aspects of the exemplary embodiments.

FIG. 28 is a schematic illustrating still more exemplary embodiments. FIG. 28 is a more detailed diagram illustrating a processor-controlled device 350. As earlier paragraphs explained, the entity's private software application 34 and/or the data layer application 132 may partially or entirely operate in any mobile or stationary processor-controlled device. FIG. 28, then, illustrates the entity's private software application 34 and/or the data layer application 132 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 29:
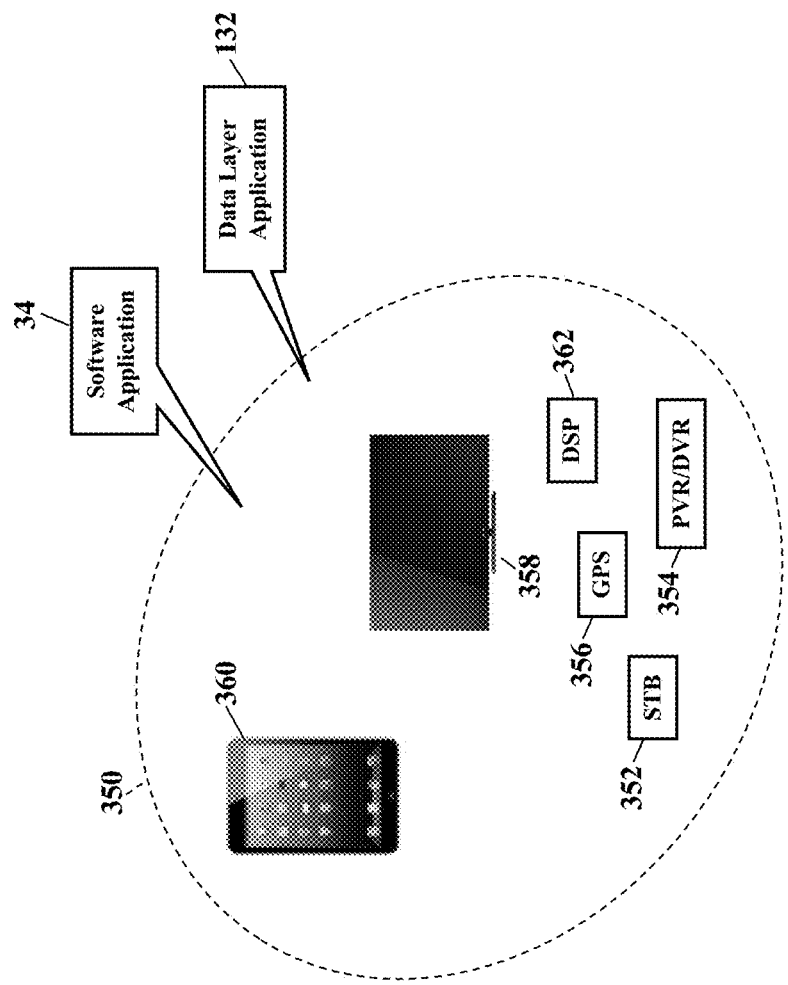

FIG. 29 depicts other possible operating environments for additional aspects of the exemplary embodiments. FIG. 29 illustrates the entity's private software application 34 and/or the data layer application 132 operating within various other processor-controlled devices 350. FIG. 29, for example, illustrates that the entity's private software application 34 and/or the data layer application 132 may entirely or partially operate within a set-top box ("STB") (352), a personal/digital video recorder (PVR/DVR) 354, a Global Positioning System (GPS) device 356, an interactive television 358, a tablet computer 360, or any computer system, communications device, or processor-controlled device utilizing any of the processors above described and/or a digital signal processor (DP/DSP) 362. Moreover, the processor-controlled device 350 may also include wearable devices (such as watches), radios, vehicle electronics, clocks, printers, gateways, mobile/implantable medical devices, and other apparatuses and systems. Because the architecture and operating principles of the various devices 350 are well known, the hardware and software componentry of the various devices 350 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for load balancing, as the above paragraphs explain.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method executed by a server that load balances virtual machines processing private blockchains, the method comprising:

receiving, by the server, the private blockchains as inputs, each private blockchain of the private blockchains associated with a corresponding private entity, and the each private blockchain containing cryptographically hashed private data associated with a private cryptocoinage issued by the corresponding private entity;

allocating, by the server, the virtual machines by executing a blockchain load balancing mechanism among the private blockchains;

determining, by the server, a parameter associated with the each private blockchain of the private blockchains;

querying, by the server, an electronic database for the parameter associated with the each private blockchain, the electronic database electronically associating the virtual machines to blockchain parameters including the parameter associated with the each private blockchain;

identifying, by the server, a virtual machine of the virtual machines in the electronic database that is electronically associated to the parameter associated with the each private blockchain; and generating, by the server, a blockchain data layer by the virtual machine identified by the electronic database that is electronically associated to the parameter associated with the each private blockchain, the blockchain data layer based on the each private blockchain containing the cryptographically hashed private data associated with the private cryptocoinage issued by the corresponding private entity.

2. A server that load balances virtual machines processing private blockchains, the server comprising:
- a hardware processor; and
- a memory device storing instructions that when executed by the hardware processor perform operations, the operations comprising:
- receiving the private blockchains as inputs, each private blockchain of the private blockchains associated with a corresponding private entity, and the each private blockchain containing cryptographically hashed private data associated with a private cryptocoinage issued by the corresponding private entity;
- allocating virtual machines by executing a blockchain load balancing mechanism among the private blockchains;
- determining a parameter associated with the each private blockchain of the private blockchains;
- querying an electronic database for the parameter associated with the each private blockchain, the electronic database electronically associating the virtual machines to blockchain parameters including the parameter associated with the each private blockchain;
- identifying a virtual machine of the virtual machines in the electronic database that is electronically associated to the parameter associated with the each private blockchain; and
- generating a blockchain data layer by the virtual machine identified by the electronic database that is electronically associated to the parameter associated with the each private blockchain, the blockchain data layer based on the each private blockchain containing the cryptographically hashed private data associated with the private cryptocoinage issued by the corresponding private entity.

3. A memory device storing instructions that when executed by a hardware processor perform operations, the operations comprising:
- receiving private blockchains as inputs, each private blockchain of the private blockchains associated with a corresponding private entity, and the each private blockchain containing cryptographically hashed private data associated with a private cryptocoinage issued by the corresponding private entity;
- allocating virtual machines by executing a blockchain load balancing mechanism among the private blockchains;
- determining a parameter associated with the each private blockchain of the private blockchains;
- querying an electronic database for the parameter associated with the each private blockchain, the electronic database electronically associating the virtual machines to blockchain parameters including the parameter associated with the each private blockchain;
- identifying a virtual machine of the virtual machines in the electronic database that is electronically associated to the parameter associated with the each private blockchain; and
- generating a blockchain data layer by the virtual machine identified by the electronic database that is electronically associated to the parameter associated with the each private blockchain, the blockchain data layer based on the each private blockchain containing the cryptographically hashed private data associated with the private cryptocoinage issued by the corresponding private entity.

4. The memory device of claim 3, wherein the operations further comprise receiving a block of data associated with the private cryptocoinage.

5. The memory device of claim 3, wherein the operations further comprise determining a number of transactions as the parameter, the number of transactions represented by the each private blockchain containing the cryptographically hashed private data associated with the private cryptocoinage issued by the corresponding private entity.

6. The memory device of claim 5, wherein the operations further comprise identifying the virtual machine in the electronic database that is electronically associated to the number of transactions represented by the each private blockchain.

7. The memory device of claim 3, wherein the operations further comprise determining a bit rate of the each private blockchain.

8. The memory device of claim 7, wherein the operations further comprise identifying the virtual machine in the electronic database that is electronically associated to the bit rate of the each private blockchain.

* * * * *